Dec. 21, 1965          W. J. MULDOON ETAL          3,225,279
         PROGRAMMED DIGITAL TO ANALOG FUNCTION GENERATOR MOTOR CONTROL
                          FOR AN X-Y PLOTTER
Filed Dec. 29, 1961                                19 Sheets-Sheet 1

William J. Muldoon,
Robert W. Peterson,
INVENTORS,
BY

AGENT.

$\phi = 120°;\ \pi - \phi = 60°;\ r = 8$
$C = r \cos 60° = 4.00$
$D = r \sin 60° = 6.93$ $\phi = 210°;\ \pi - \phi = -30°;\ r = 8$
$C = r \cos(-30°) = 6.93$
$D = r \sin(-30°) = -4.00$

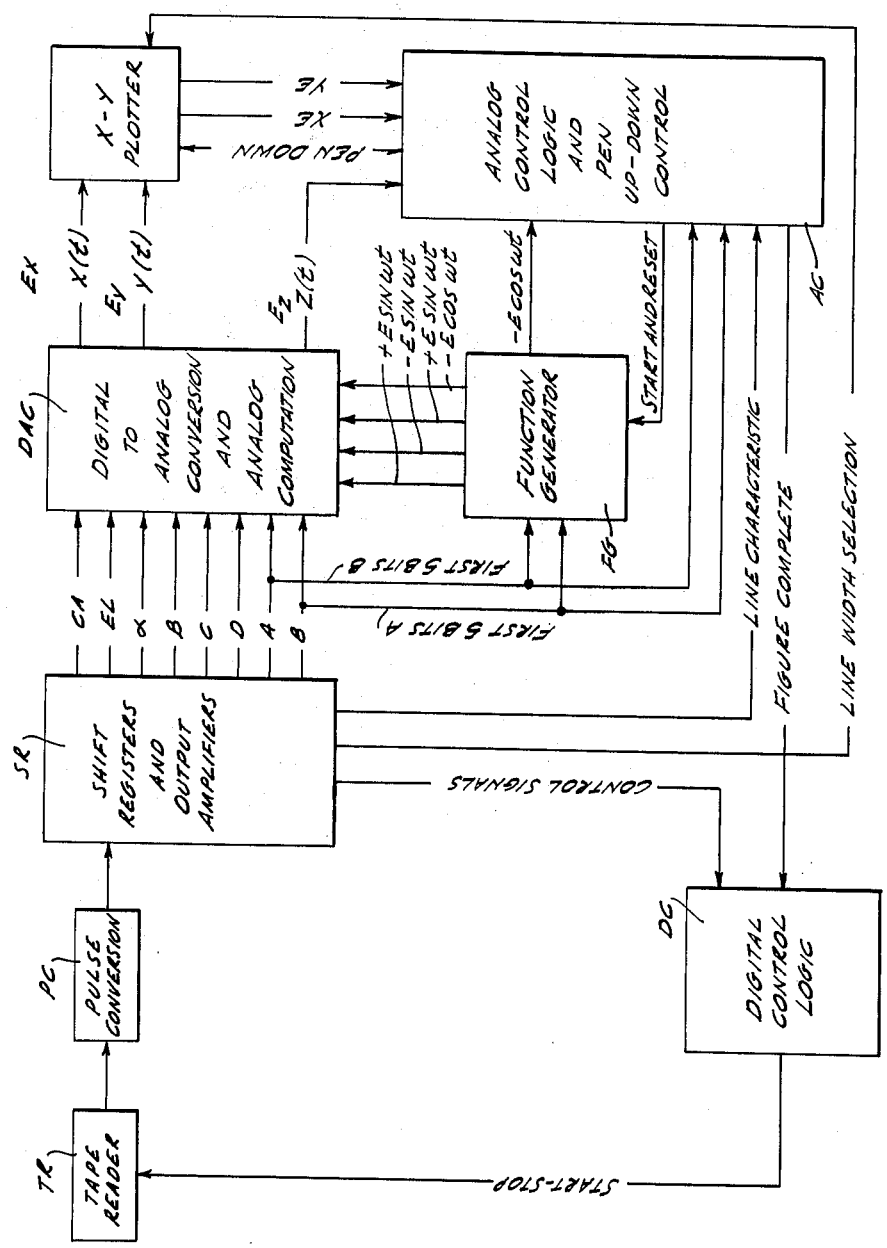

FIG. 30.

| | | | | | | | | | | | | | | | | | | | | |
|---|---|---|---|---|---|---|---|---|---|---|---|---|---|---|---|---|---|---|---|---|
| \multicolumn{20}{c}{LATERAL PARITY CHANNEL} | CH 7 |
| TK | SP | 3 | 0 | 5 | 10 | 14 | 9 | 4 | 14 | 9 | 4 | 14 | 9 | 4 | 14 | 9 | 4 | 14 | 9 | 4 | CH 6 |
| TN | B>A | 4 | 1 | 6 | 11 | 13 | 8 | 3 | 13 | 8 | 3 | 13 | 8 | 3 | 13 | 8 | 3 | 13 | 8 | 3 | CH 5 |
| \multicolumn{20}{c}{CLOCK PULSE CHANNEL} | CH 4 |
| PH | 0 | 5 | 2 | 7 | 12 | 12 | 7 | 2 | 12 | 7 | 2 | 12 | 7 | 2 | 12 | 7 | 2 | 12 | 7 | 2 | CH 3 |
| HI | 1 | 6 | 3 | 8 | 13 | 11 | 6 | 1 | 11 | 6 | 1 | 11 | 6 | 1 | 11 | 6 | 1 | 11 | 6 | 1 | CH 2 |
| CE | 2 | 7 | 4 | 9 | 14 | 10 | 5 | SN | 10 | 5 | SN | 10 | 5 | SN | 10 | 5 | SN | 10 | 5 | EL | 10 | 5 | CA | CH 1 |
| | DA | LA | D | C | B | A | β | α | |

- DA – DRAWING ADDRESS
- LA – LINE ADDRESS
- CE – CENTERLINE
- CA – CIRCULAR ARC
- SN – SIGN
- TK – THICK PEN
- TN – THIN PEN
- PH – PHANTOM LINE
- HI – HIDDEN LINE
- EL – ELLIPSE
- SP – SLOW PEN

NUMERICAL DESIGNATION IN PROGRAM EQUALS X IN $2^{-X}$ AND EQUALS RATIO OF FULL SCALE VALUE.

CLOCK PULSE BITS ARE ALL ONES.

PARITY – EVEN, LONGITUDINAL
– ODD – LATERAL.

| FIG. 31a. | FIG. 31b. | FIG. 31c. |

FIG. 31.

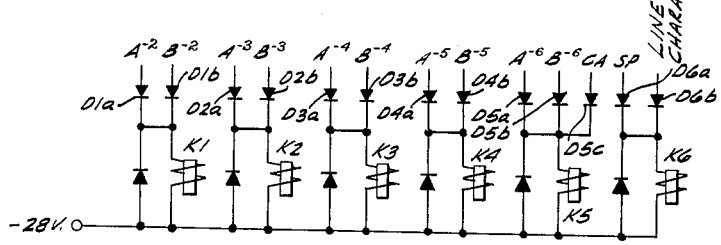

FIG. 36.

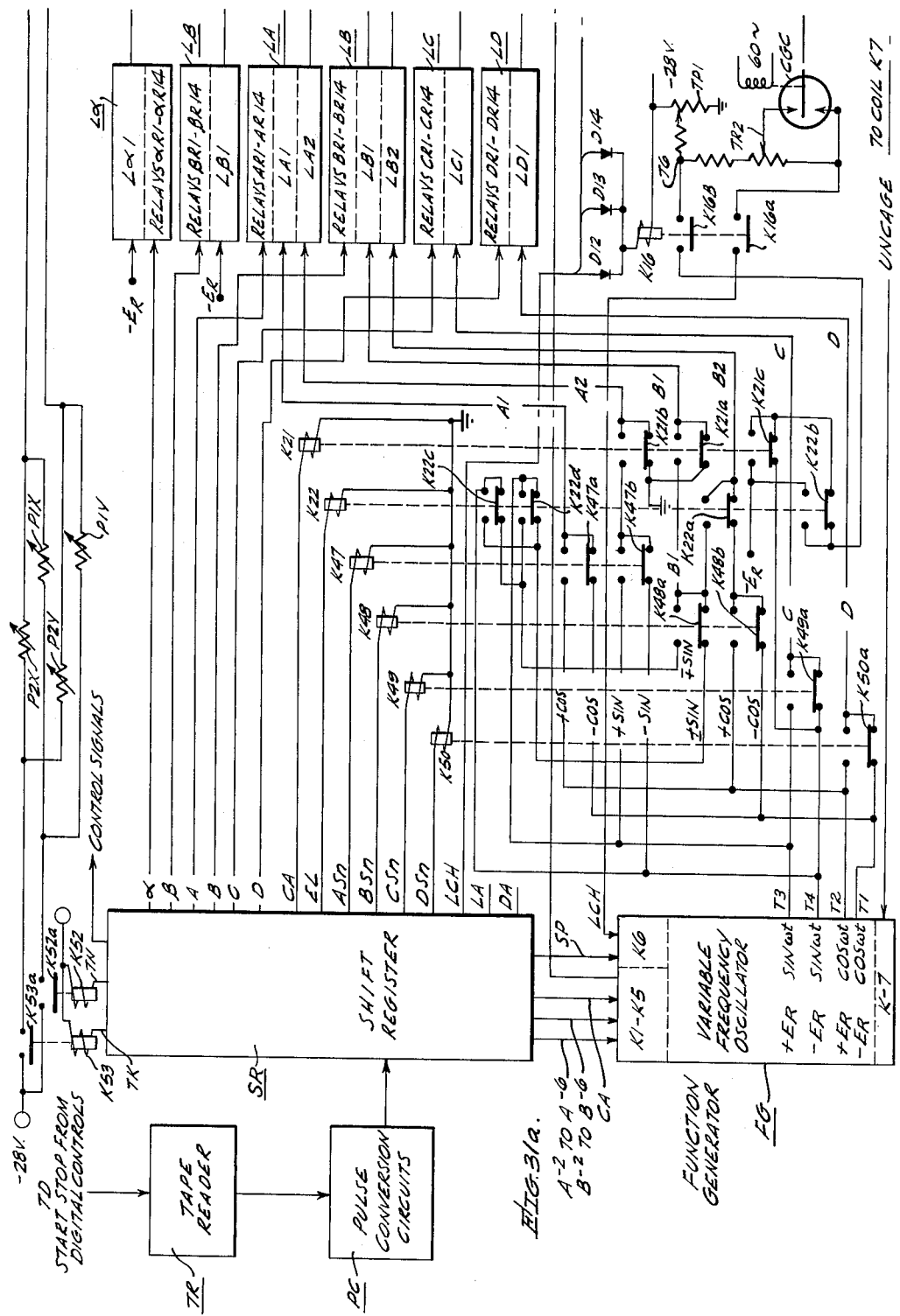

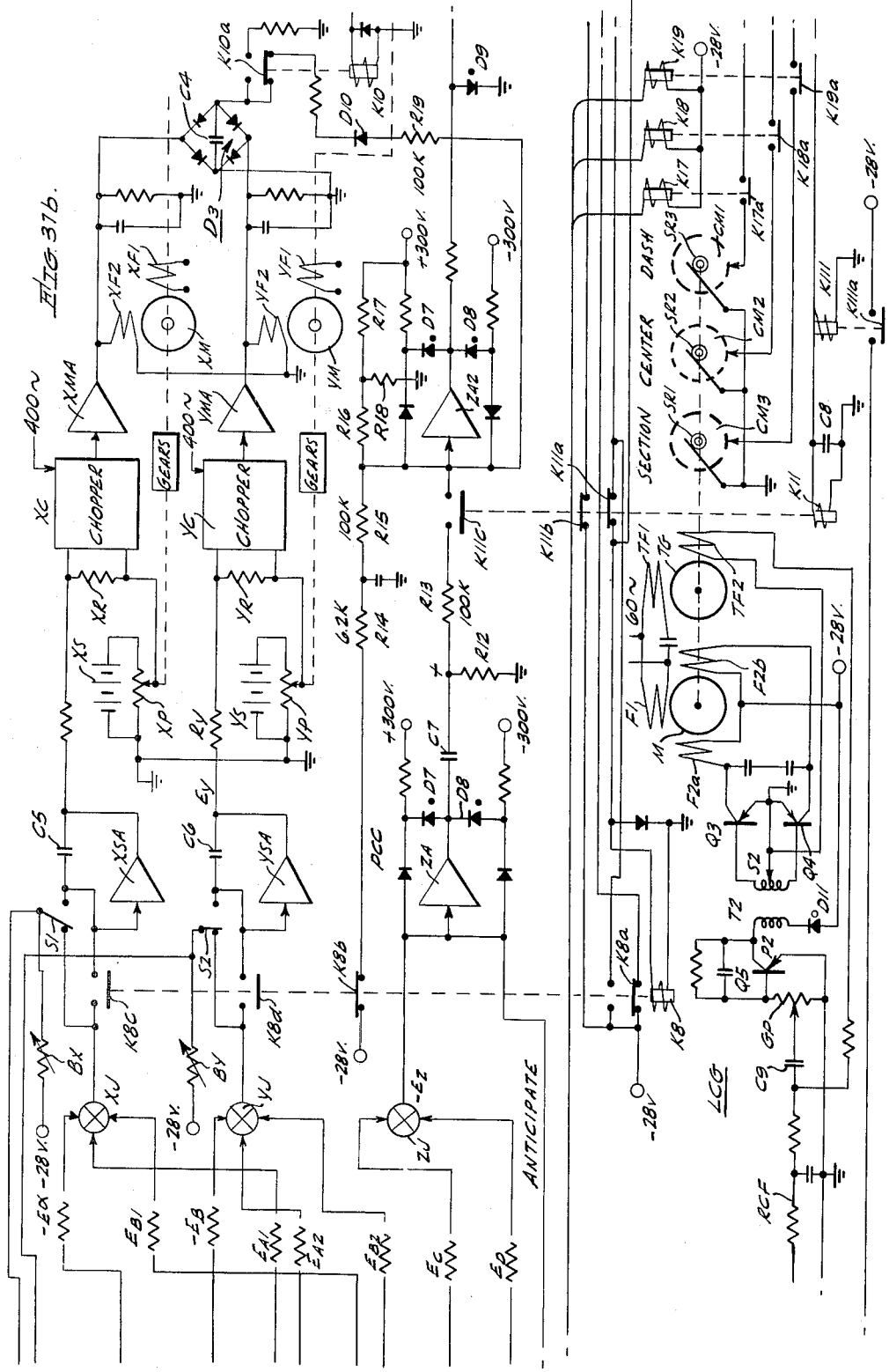

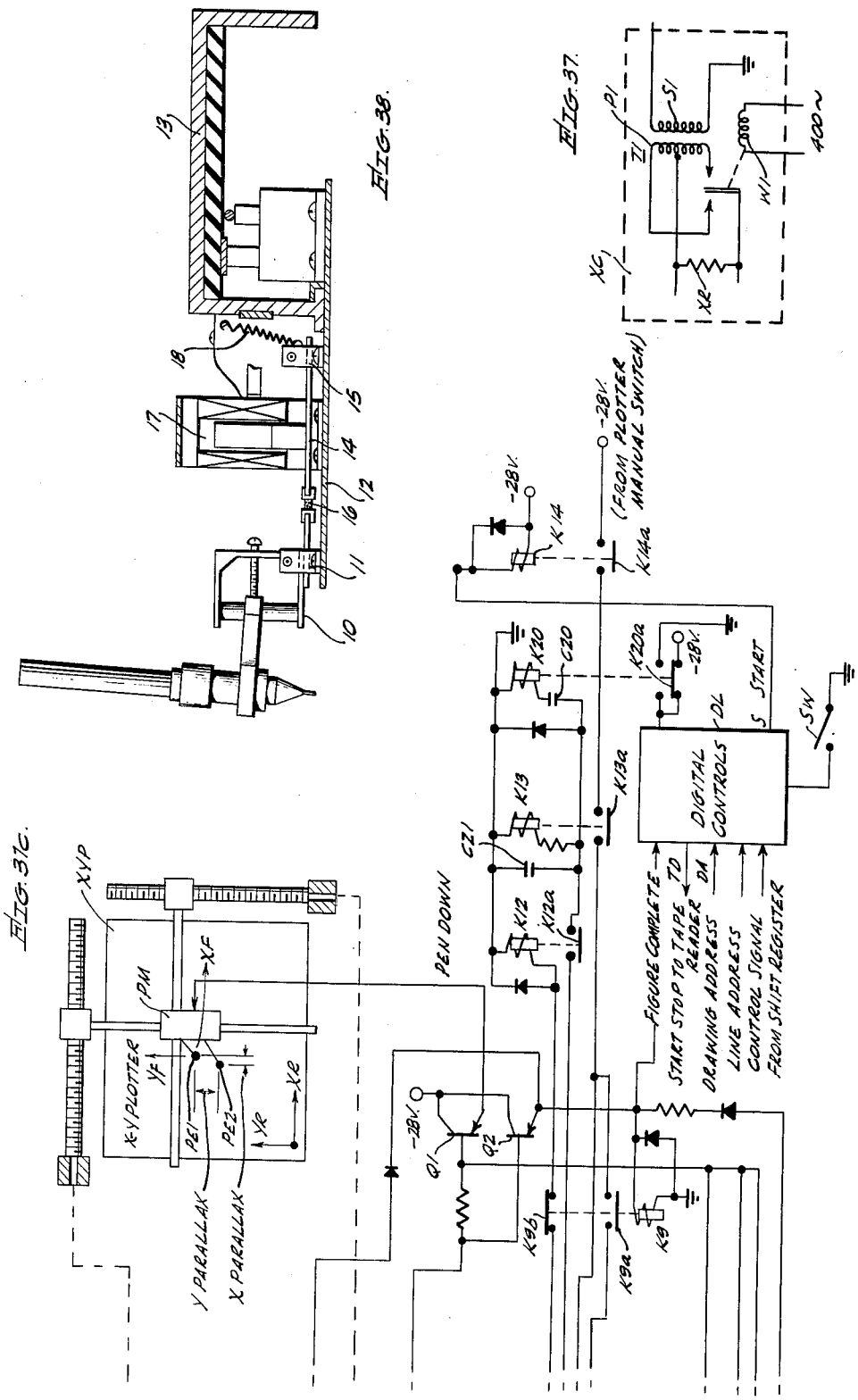

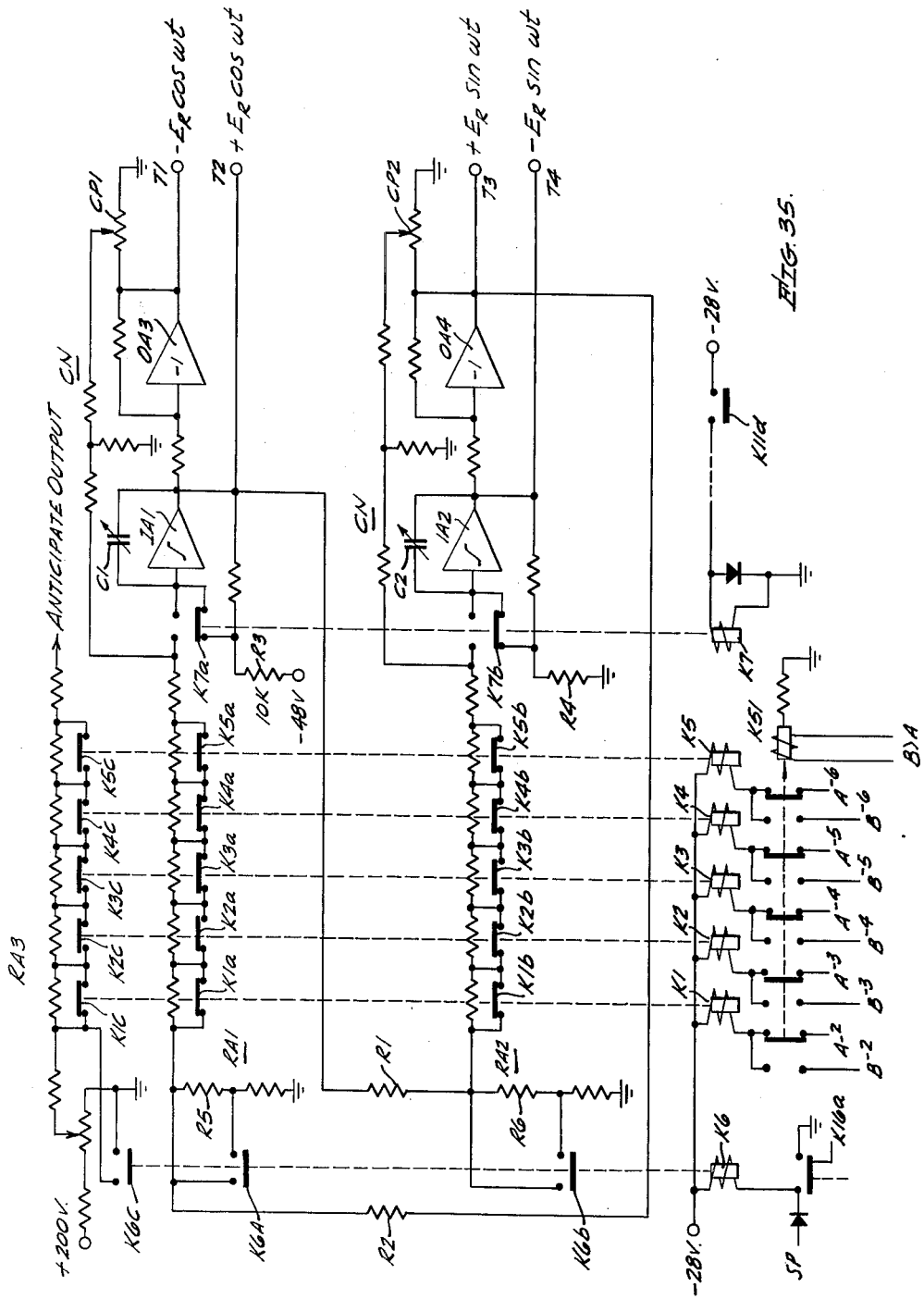

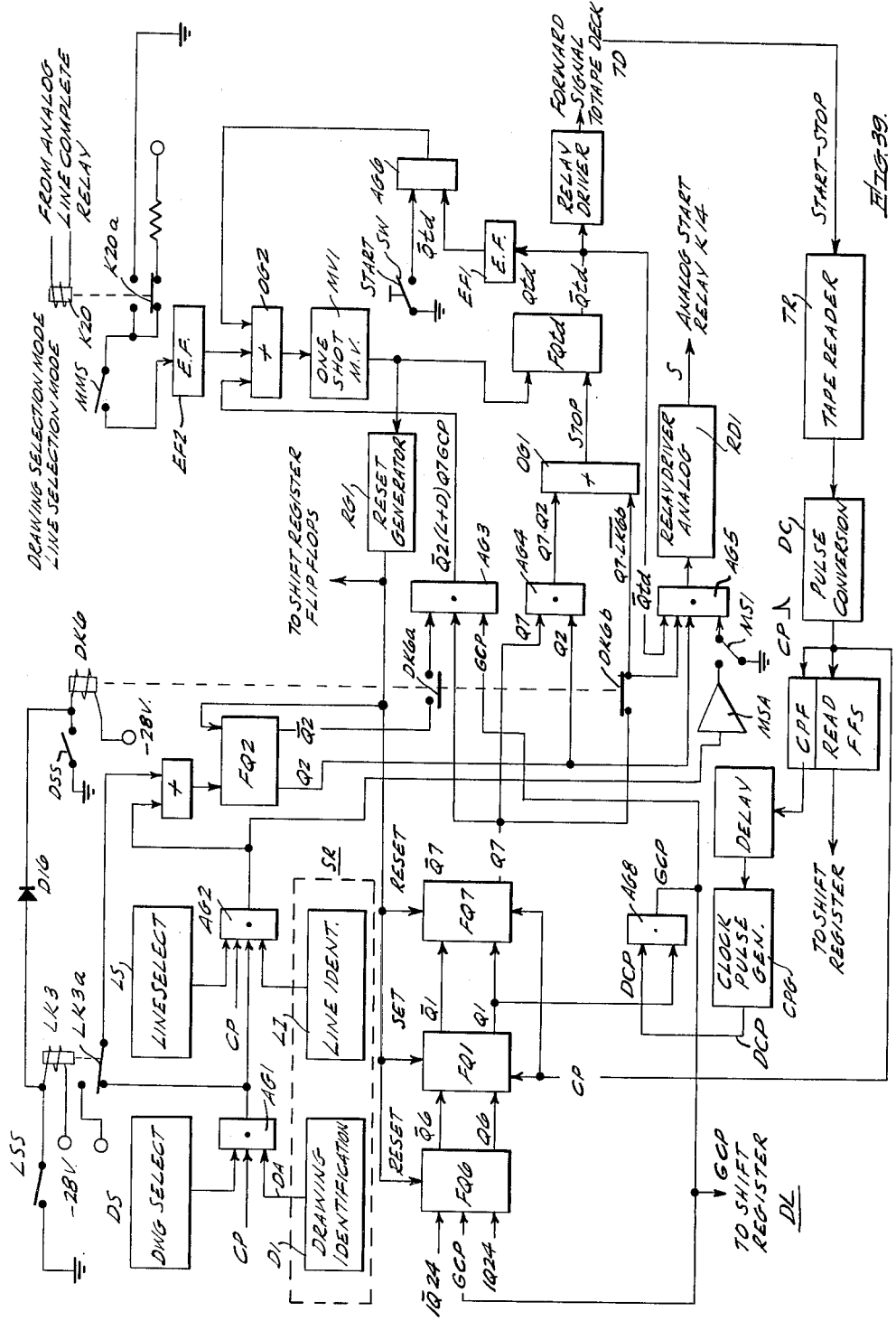

United States Patent Office 3,225,279
Patented Dec. 21, 1965

3,225,279
PROGRAMMED DIGITAL TO ANALOG FUNCTION GENERATOR MOTOR CONTROL FOR AN X—Y PLOTTER
William J. Muldoon, Palos Verdes Estates, and Robert W. Peterson, Sepulveda, Calif., assignors to Hughes Aircraft Company, Culver City, Calif., a corporation of Delaware
Filed Dec. 29, 1961, Ser. No. 163,155
17 Claims. (Cl. 318—162)

This invention relates generally to systems of electrical control, and more particularly to such systems which are capable of accurately positioning and moving an element in accordance with a predetermined instruction program.

While the descriptive disclosure hereinafter is particularly directed to a system for moving a pen or other line drawing implement according to a specified program for the purpose of making drawings, writing, printing and the like, it will be appreciated that this invention is not particularly limited to such a specific function or to such a particular type of output device but may be used to power any suitable device in the layout or manufacture of printed circuits in machining operations, etc.

Efforts have been made by others to automatize drafting, that is, to automatize the making of line drawings. These prior art systems have been developed to the point where the specific drawing is completely encoded on a digital record member as a digital program. These systems are usually based upon a system of mathematics, defining straight lines in point-slope form. The digital program is transduced in a specific sequence and converted to analog form to power a suitable type of analog servo system having a pair of servo motors which power and move a single output member in each of two mutually perpendicular directions.

These prior art arrangements have proved satisfactory for drawing straight lines at differing slopes. They have, however, been particularly limited to the drawing of straight lines. In such systems curves have been simulated by drawing short, straight lines of progressively changing slopes in end-to-end relationship. In a system of this type, depending upon how accurately a curved line is to be simulated, the use of shorter and shorter straight line segments requires correspondingly larger numbers of definitions of line start and end points to achieve the desired approximated curve. This is a very time consuming operation from the viewpoint of preparing the program, as well as from the viewpoint of the time of operation of the machine in reading and reproducing these multitudes of short, straight line segments in simulating curves.

An object of this invention is to provide an improved system for selectively generating both straight lines and curves at controlled speeds.

It is also an object hereof in a system for generating geometric figures in which a geometric figure is defined in a reference plane in terms of distances in two coordinates from a reference point in the reference plane to the geometric center of the figure, together with distances in two coordinates defining the figure with respect to its geometric center to utilize quantities proportional to the coordinates of the starting point of a line describing the figure to control the speed of line generation.

Still another object of this invention is to provide an improved system for generating geometric figures which includes provisions for simultaneously generating suitably electrically phased sets of time varying electrical quantities having a frequency substantially inversely proportional to the length of the line describing the figure for controlling position servos.

It is additionally an object of this invention to provide an improved electrical control system including provisions for generating a plurality of adjustable frequency, time varying electrical quantities and steady state electrical quantities and for combining these differing quantities in differing ways to produce an electrical quantity having a desired time varying characteristic.

With respect to the preceding object, it is an object hereof to provide an improved time varying electrical function generator.

Specifically, it is an object hereof in a system of the character referred to to utilize a variable frequency oscillator producing line generating voltages and for controlling line generating speeds.

It is a further object of this invention in a system of the character referred to to provide an improved control of servo speed for drawing lines of any length.

The aforesaid and other objects and advantages are achieved in an arrangement according to this invention which generates and employs time variable electrical quantities characterized by selected time parametric functions for controlling a servo system to selectively describe straight lines, circular arcs, or circles, and elliptical arcs, or ellipses, of specific dimension or sizes and at particularly defined points in a given reference plane, such as a drawing board.

The program of the servo system is digitally encoded on a suitable record medium, such as paper tape, magnetic tape or other record bearing medium, as a discrete information code system in conventional binary code, for instance, together with other discrete information recordings having place of a position significance on the medium for directing control of specific control elements in the system. Suitable transducers read this medium or tape and the signals thus generated after suitable conversion, amplification and shaping, if needed, are stored in a digital storage circuit such as a shift register which may include a plurality of flip flops conventionally set in correspondence with the respective discrete signals. The digitally encoded information includes the following:

(1) Dimensions in both coordinates from a reference point in the reference plane to the geometric center of the figure which is to be drawn.

(2) Dimensions and their signs defining the starting point of any line describing a geometric figure in terms of the respective coordinates of that point referred to the geometric center of the figure.

(3) Dimensions and their signs defining the stopping point of any line.

(4) Respective commands denoting if a circular arc or an ellipse is to be drawn.

(5) Respective commands denoting which of several line thicknesses is to be used.

(6) Respective commands denoting if any of several line interruption patterns (line characteristics) is to be used.

The system includes a variable frequency electrical function generator for generating sine and cosine electrical quantities of a fixed magnitude which are relatively positive or negative depending upon the algebraic signs of the coordinates defining the starting point of the line describing the geometric figure in relation to the geometric center of the figure and which vary in frequency as a function of a selected algebraic combination of at least a portion of the information defining these coordinates to provide time varying output voltages having a frequency roughly inversely proportional to the desired length of a line.

The time varying voltages thus generated are attenuated, or amplitude modulated, or multiplied by another voltage, or otherwise suitably modified, in selected pairs as a function of the coordinates of the starting point of the line defining the figure to provide simultaneous time varying X and Y line generating voltages, the corresponding instantaneous magnitudes of which jointly define respective points on the line describing the figure.

Respective position servos, termed the X and Y servos herein, are connected to and power a single output element such as a pen, for instance. The time varying voltages are applied to respective summing amplifiers the outputs of which are used to control the respective servos. These servos may include electrical motors or other suitable motor means forming part of a position servo loop of sufficient stiffness and commensurate damping to provide continuous regulation for zero voltage and, hence, position error, in following the respective time varying voltages. Such a servo arrangement may typically include a feedback potentiometer driven by a servo motor and energized by a constant or fixed voltage. The voltage tapped from this potentiometer is conventionally subtractively combined with the input voltage to the servo providing an arrangement tending to regulate for zero position error. Such a potentiometer has a length in an electrical sense at least equal to the actual maximum length of the line which may be drawn.

In operation provision is made for slewing the pen to the starting point of the line describing a selected figure. At this time the function generator is "caged" and does not produce time varying voltages. It does, however, produce positive and negative values of a fixed reference voltage which are suitably attenuated and used in the pen slewing operation. During slewing the servos are uncontrolled as to relative speeds and the pen is in elevated position. With the occurrence of a minimum threshold error in the larger of the two error quantities at the servo motor inputs, and after a time delay sufficient to allow the servo motors to settle, a signal is generated which starts the function generator and which drops the pen. The pen is now precisely positioned in line drawing position at the starting point of the line and now produces a line describing the figure which is desired, the servos now being controlled by the time varying line generating voltages. The function generator "free runs" and must be told when to stop.

Since the servos follow the respective time varying voltages, separate provision must be made to stop a line defining a geometric figure at a particular point. This is accomplished by using the function generator outputs to generate a separate time varying line-terminating voltage of sinusoidal character, for instance, which goes through zero from a positive value to a negative value, or vice versa, depending upon system requirements, in all instances, at the precise point in time on the respective time varying line generating voltages at which the line is to be interrupted. At line termination provision is made to switch the summing amplifiers for the respective servos to their memory modes so that the instantaneous magnitudes of the respective time varying line generating voltages at line termination are maintained. The servos thus have a memory of the position of the point of termination of the line. The line terminating voltage is also compensated by a voltage which varies approximately with line length to introduce a variable anticipation of line termination in proportion to pen speed to compensate the fixed electrical and mechanical delays in lifting the pen.

At this point a signal is produced indicating that the figure has been completely drawn. This signal is utilized to reset the digital storage circuits and the function generator and to initiate reading and storing an additional section of the digitally encoded input information for the purpose of drawing the next figure forming another section of the drawing.

Other objects and advantages will become apparent from as tudy of the following specification when considered in conjunction with the accompanying drawings in which.

Figure 13:
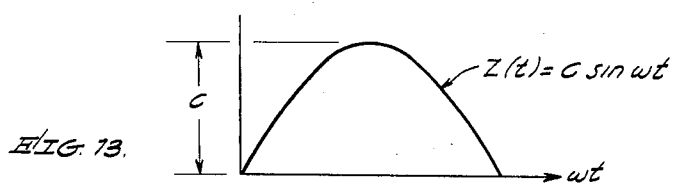
Figure 14:
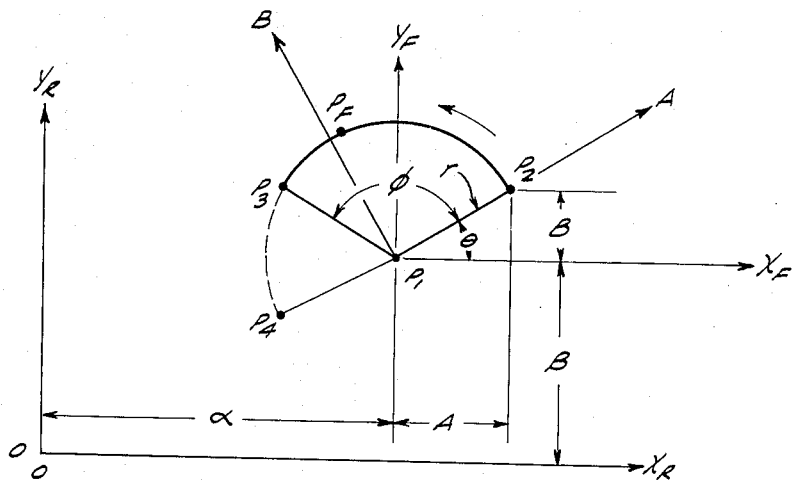
Figure 15:
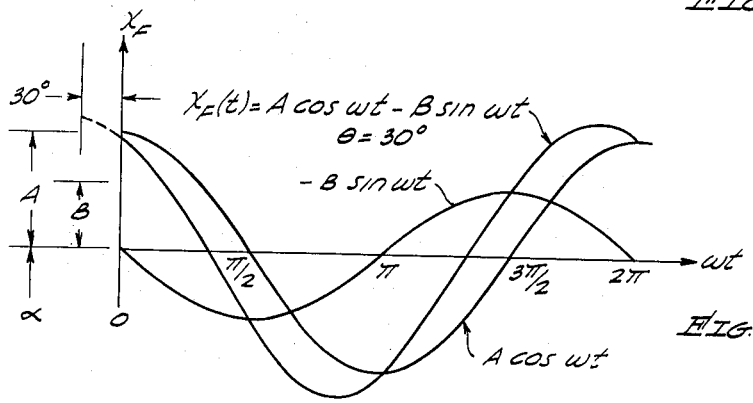
Figure 16:
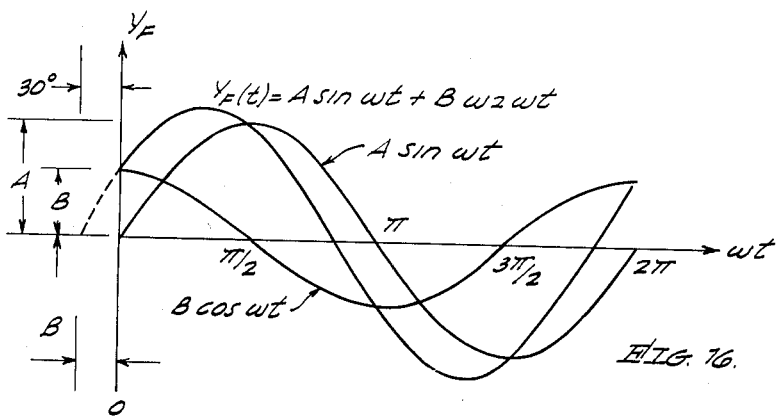
Figure 17:
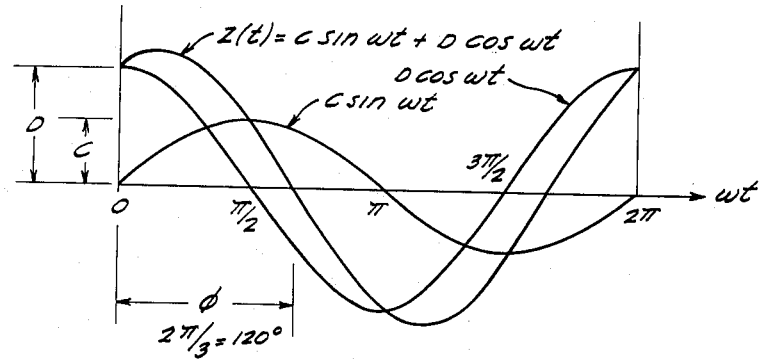
Figure 18:
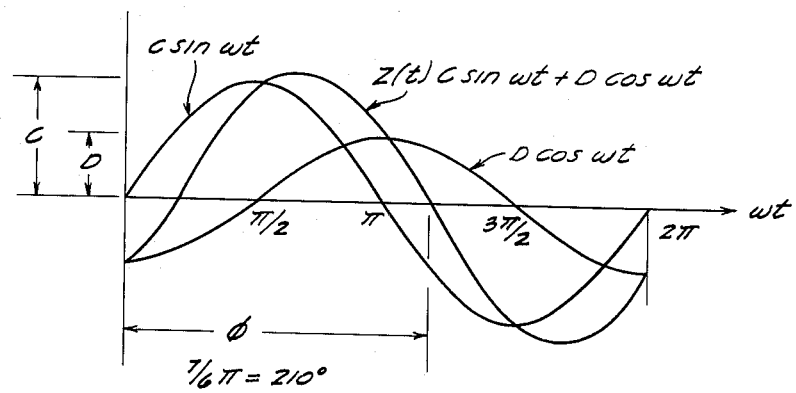
Figure 19:
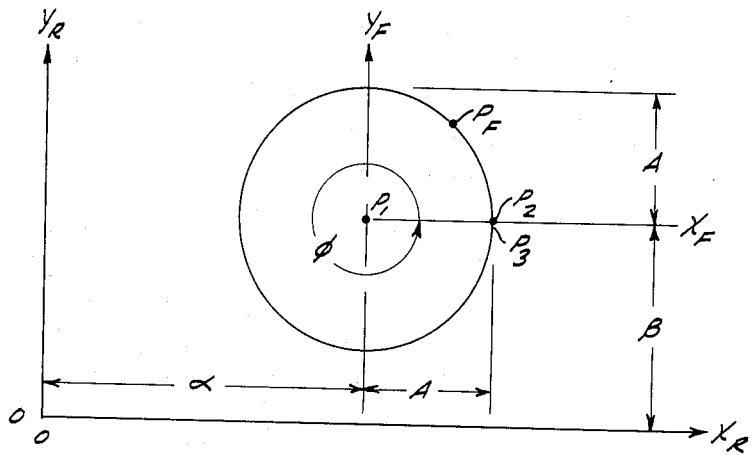
Figure 20:
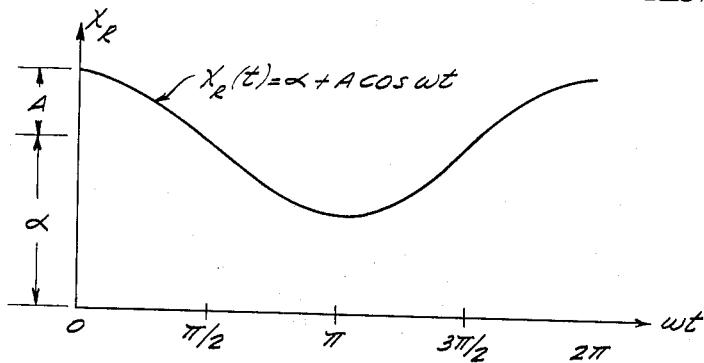
Figure 21:
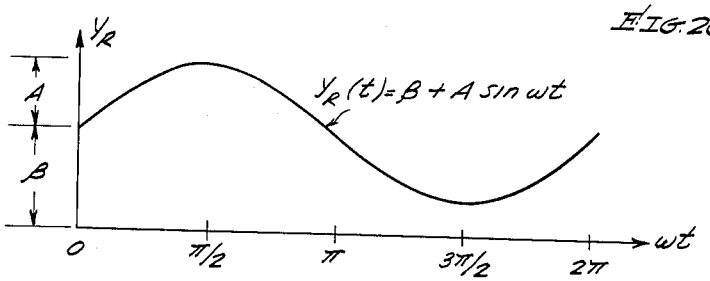
Figure 22:
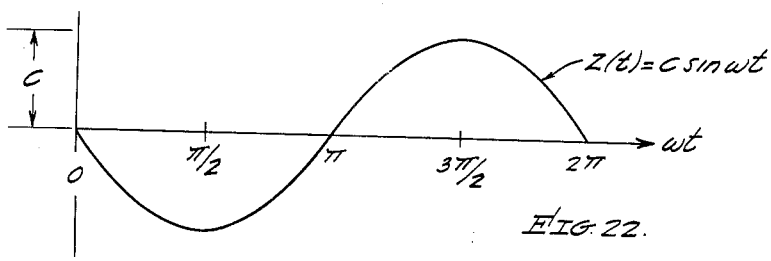
Figure 23:
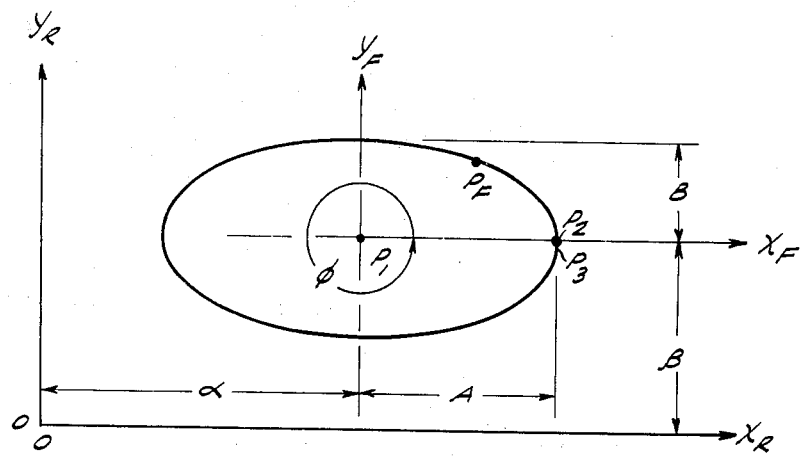
Figure 24:
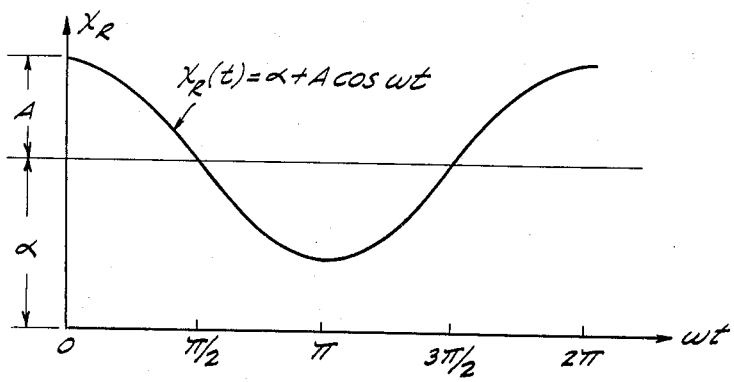
Figure 25:
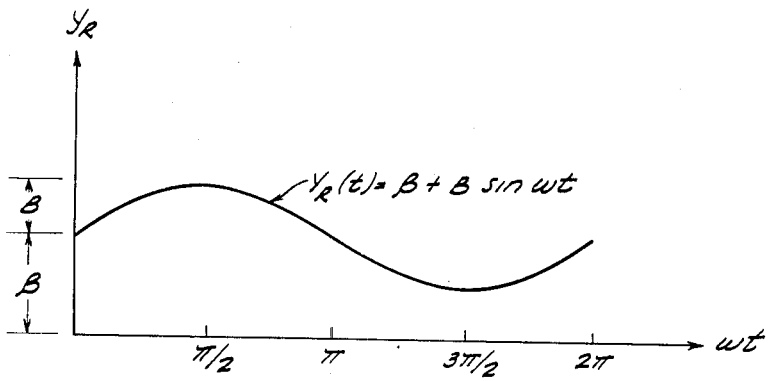
Figure 26:
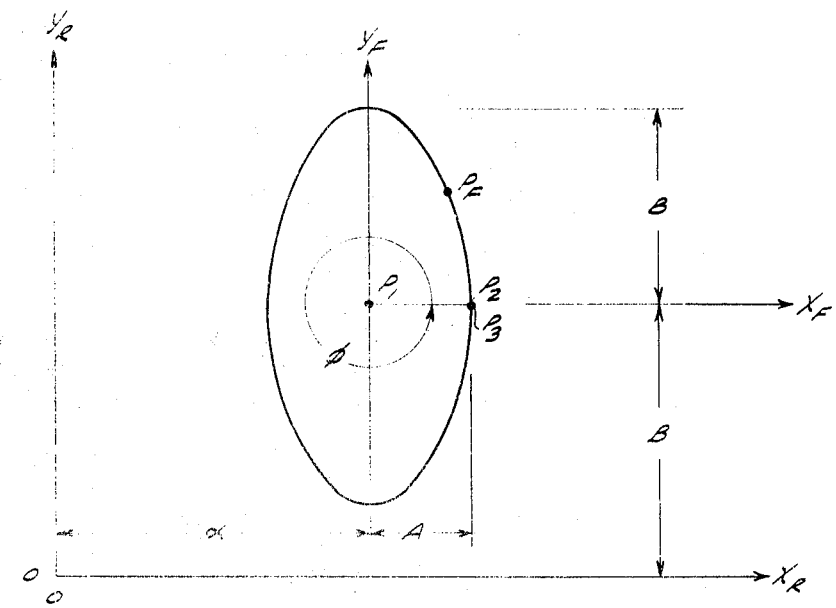
Figure 27:
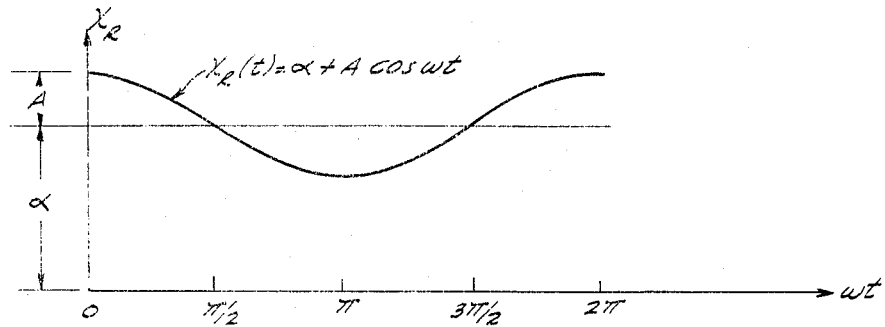
Figure 28:
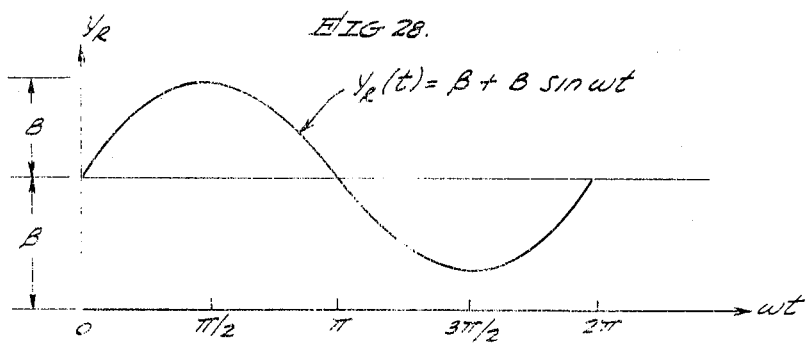

FIG. 13 graphically depicts a time varying quantity utilized as the line terminating function in the system herein and which as depicted is applicable in the termination of lines of the character indicated in FIGS. 1, 4, 7 and 10, respectively;

FIG. 14 is a graph of a circular arc having a starting point in the first quadrant of the coordinate system therefor;

FIGS. 15 and 16 are graphs of time varying quantities which depict the instantaneous magnitudes of the coordinates of points on the arc of FIG. 14;

FIG. 17 graphically depicts the time varying line terminating quantity for a circular arc of approximately the number of degrees of the arc of FIG. 14, having a stopping point in the second quadrant of the coordinate system therefor;

FIG. 18 graphically depicts the time varying line terminating quantity for an arc as seen in FIG. 14, having a stopping point in the third quadrant of the coordinate system therefor;

FIG. 19 is a graph of a circle having a starting point on the positive horizontal axis of a coordinate system intersecting at the center of the circle;

FIGS. 20 and 21 graphically depict the time varying line generating quantities defining the coordinates of points on the circle of FIG. 19;

FIG. 22 graphically depicts the time varying line terminating quantity for the circle;

FIG. 23 is a graph of an ellipse having its major axis on the horizontal axis and its minor axis on the vertical axis of a coordinate system intersecting at the geometric center of the ellipse;

FIGS. 24 and 25 graphically depict time varying line generating quantities indicating the instantaneous magnitudes of the coordinates of points on the ellipse of FIG. 23;

FIG. 26 is a graph of an ellipse having its minor axis on the horizontal axis and its major axis on the vertical axis of a coordinate system intersecting in the geometric center of the ellipse;

FIGS. 27 and 28 are time varying line generating quantities depicting the magnitudes of the coordinates of points on the ellipse of FIG. 26.

FIG. 29 is a block diagram of an improved electrical system of control for controlling the movement and/or position of an element and which embodies the principles of this invention.

FIG. 30 illustrates a typical tape format employable in programming the present system;

FIG. 31 illustrates the arrangements of the sheets of drawings containing FIGS. 31a, 31b and 31c to form a complete circuit;

FIGS. 31a, 31b and 31c viewed together illustrate the electrical system of FIG. 29 in greater detail.

Figure 32:
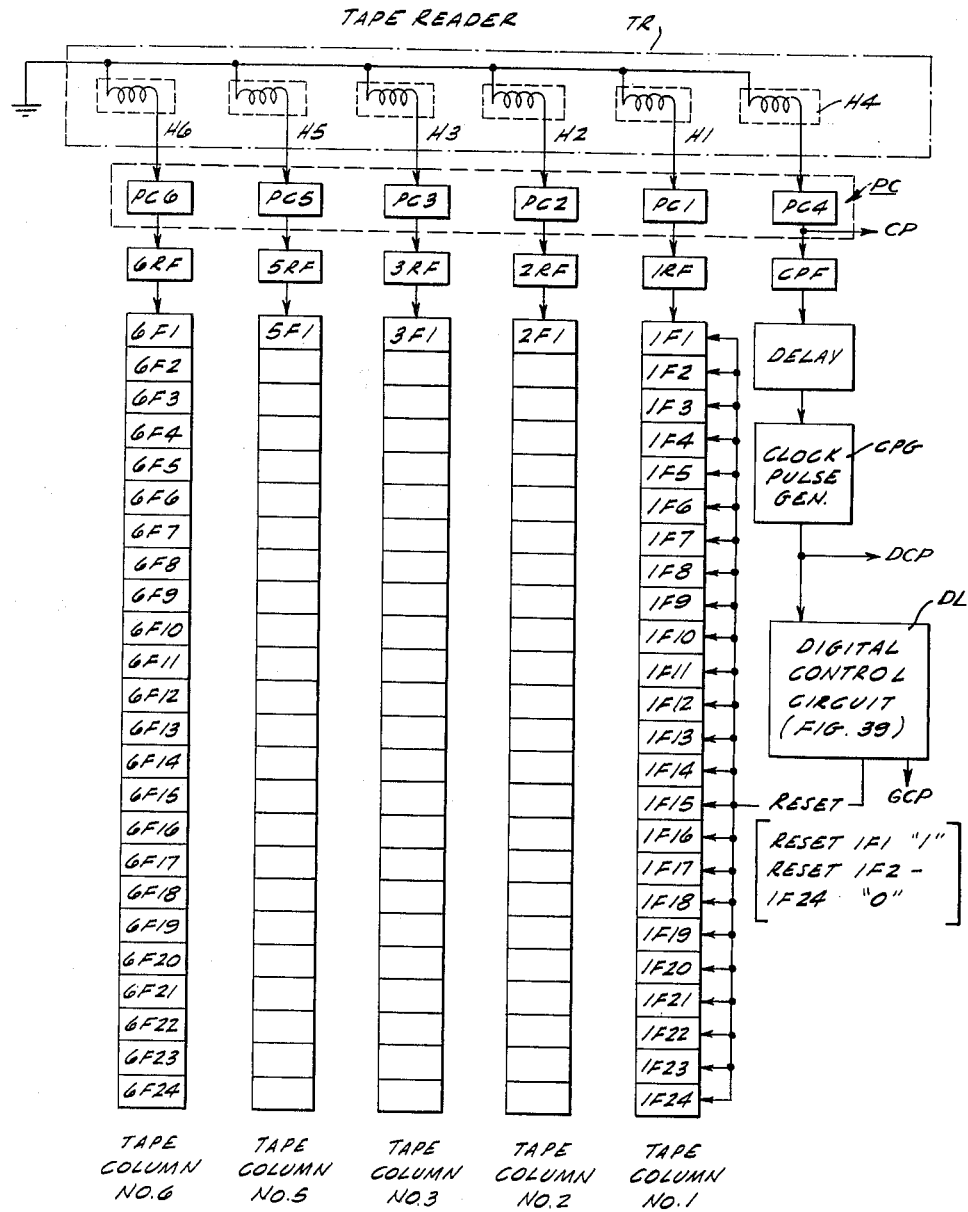
Figure 33:
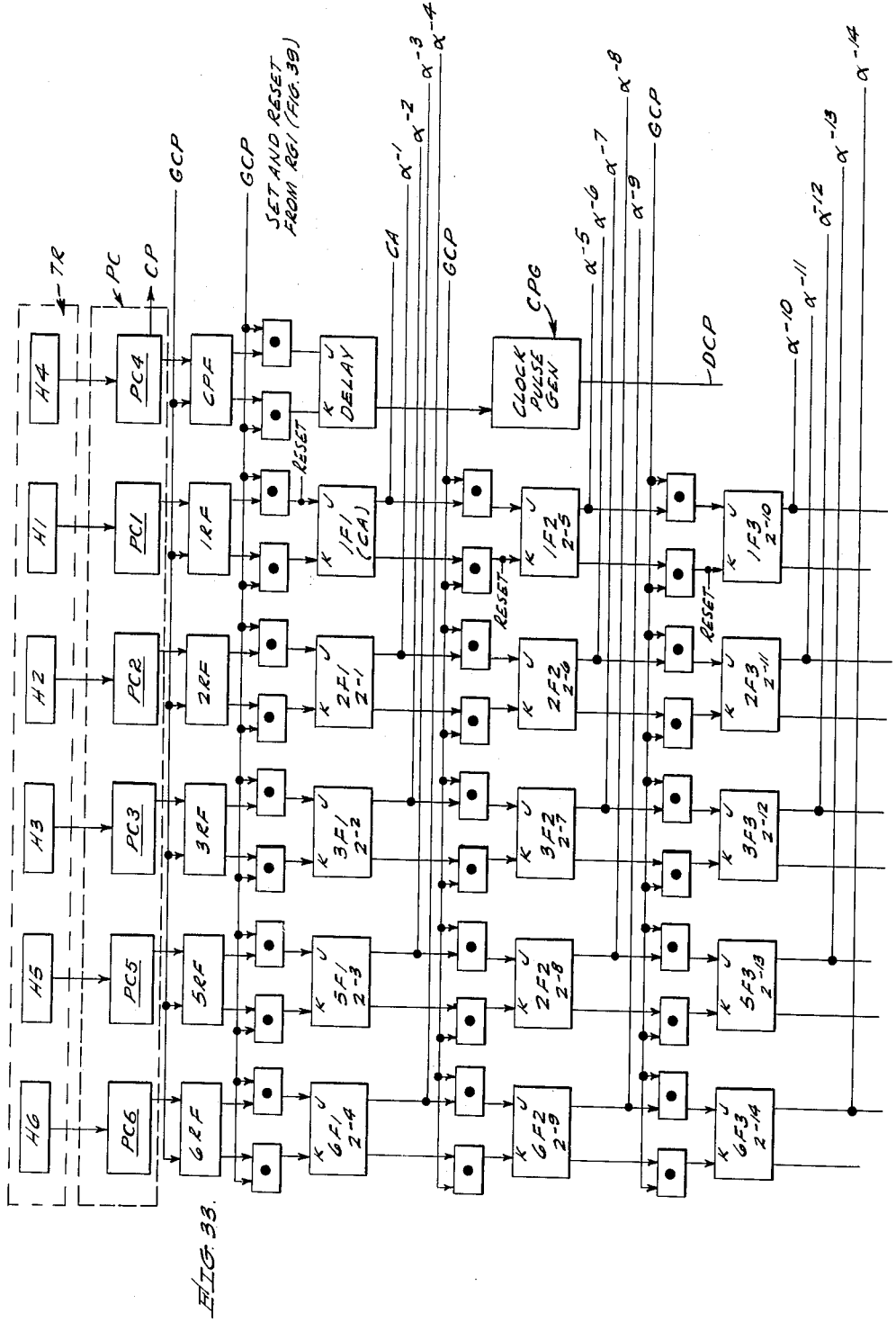
Figure 34:
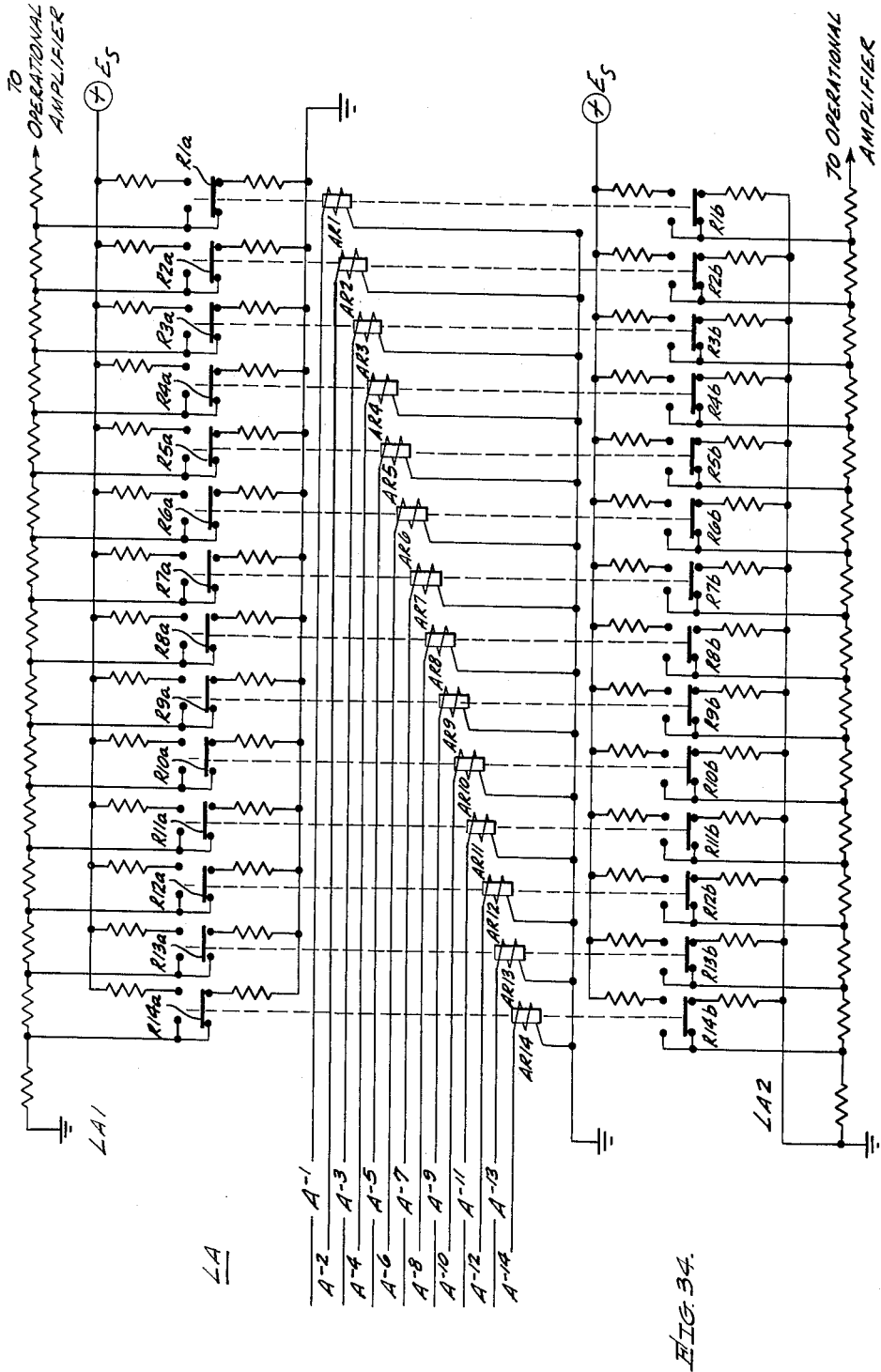

FIG. 32 schematically illustrates the organizational relationship of the tape reader and shift register of this invention;

FIG. 33 illustrates certain features of a portion of the shift register of FIG. 32 in greater detail;

FIG. 34 diagrammatically illustrates a type of analog to digital converter employed in this invention;

FIG. 35 diagrammatically illustrates a function generator of the type employed in this invention;

FIG. 36 illustrates a modification of the relay control circuit of FIG. 34;

FIG. 37 diagrammatically illustrates a chopper of the type employed in this invention;

FIG. 38 schematically illustrates certain features of an arrangement for movably mounting a pen of the type employed in the X—Y plotter herein to permit movement between retracted and drawing positions; and FIG. 39 diagrammatically illustrates certain features of the digital controls employed herein.

The design of a system for producing movement of an output member in any direction in a single plane is dedependent upon the type of drive which is employed to move the output member. The output member herein is movably supported by a mechanism having respective X and Y input members movable along paths which are mutually perpendicular. These input members are powered by respective motors. This arrangement is commonly known as an X—Y plotter and the motors are referred to herein as the X motor and the Y motor, respectively.

If the X input member is moved and the Y input member remains stationary the movement of the output member parallels the movement of the X input member. Movement of the output member in a direction paralleling movement of the Y input member occurs when the X input member remains stationary while the Y input member moves. Simultaneous movement of the X and Y members at speeds such that the ratio of Y displacement to X displacement at any instant is a constant defines a straight line having a slope $Y/X$. If $Y=f(X)$ is nonlinear then a curve is generated. The nature of the curve depends upon the specific functional relationship.

The present system is directed to providing movement of the output member in such a way as to selectively generate straight lines of any slope, circular arcs, circles and elliptical arcs or ellipses and requires facilities for generating suitable electrical quantities for energizing the X and Y motors on the plotter to selectively generate the geometric figures described at any selected point on the plotter surface or reference plane defined thereby.

The mathematics of the system is based upon a geometry in which the geometric center of the figure to be drawn is the point of reference in defining the figure. The location of a figure in the reference plane is defined as the coordinate distances in $X_R$ and in $Y_R$ from the lower left corner of the reference plane to the geometric center of the figure. This defined center is the zero reference for a second system of rectangular coordinates $X_F$, $Y_F$ for the figure per se from which the coordinates of half-lengths of lines, the cordinates of radii and the coordinates of half-lengths of axes of ellipses are measured.

A general system of simultaneous, time parametric, line generating equations defines the geometric configuration of several figures as a locus of points having coordinates in $X_F$ and $Y_F$ and identifies the precise point at which a line describing a figure is to be started with respect to the zero point, i.e., the intersection of the axes $X_F$ and $Y_F$ for that figure.

Another time parametric equation defines the precise point in the coordinate system for a figure at which the line describing the figure is to be terminated.

The general system of time parametric line generating equations and the line terminating equation have a common parameter, $\omega t$, and are set forth below followed by several special forms of the equations resulting from special and specific cases.

The terms "positive slope" and "negative slope" are used herein in describing inclined straight lines. When the ratio of $Y_F$ to $X_F$ is positive, the slope is assumed to be positive, and when the ratio of $Y_F$ to $X_F$ is negative, the slope is assumed to be negative regardless of the direction of drawing of the line.

GENERAL EQUATIONS

*Line generating equations (general form)*

$$X_R(t) = \alpha + A \cos \omega t - B \sin \omega t \quad (1)$$
$$Y_R(t) = \beta + A \sin \omega t + B \cos \omega t \quad (2)$$

where: $\alpha$ and $\beta$ are respectively distances in $X_R$ and $Y_R$ from the lower left corner of the reference plane (drawing board) to the geometric center of the figure and define the intersection of the translated axes $X_F$, $Y_F$ which are the axes of the geometric figure to be drawn. The axes A and B are the translated and rotated axes having an intersection common with the axes $X_F$ and $Y_F$.

$$A = r \cos \theta = P_2(X_F) \quad (3)$$
$$B = r \sin \theta = P_2(Y_F) \quad (4)$$

where: $r$ is the half-length of a straight line, the radius of a circular arc or the half-length of an axis of an ellipse and $\theta$ is the angle measured counterclockwise from positive A ($X_F$) (conventionally on the right of $Y_F$) to the radial line intercepting the transformed $\alpha$ and $\beta$ origin and a point, say $P_2$, at which a circular arc, a circle, an ellipse or straight line is started. Graphically, $\theta$ determines the counterclockwise angle $\omega t$ through which the axes A and B are rotated so that A intercepts $P_2$, whence Equations 1 and 2 above also relate the original and rotated coordinates of $P_2$ or, more generally, any point $P_F$ on a line through $P_2$. Alternatively, $\omega t$ may be regarded as the clockwise angle through which the axes $X_F$, $Y_F$ are rotated. In each instance $\theta = \omega t$.

Sin $\omega t$ and cos $\omega t$ are variable frequency transcendental functions which are selectively positive or negative in the system, depending upon the algebraic signs of A and B in the respective expressions $A \cos \omega t$, $B \sin \omega t$, etc., which always start at 0° (positive values of A or B) or 180° (negative values of A or B), independently of $\theta$, which are generated in the system when the conditions $\alpha \pm A$ and $\beta \pm B$ are satisfied and which may be terminated at any point in one full cycle depending upon $Z(t)$, Equation 5, which follows.

*Line terminating equations (general form)*

$$Z(t) = C \sin \omega t + D \cos \omega t \quad (5)$$

where:

$$C = r \cos (\pi - \phi) = X_F \quad (6)$$
$$D = r \sin (\pi - \phi) = Y_F \quad (7)$$

where: $r$ is defined in connection with Equations 3 and 4, and $\phi = \omega t =$ the number of degrees in an arc of a circle, a circle or an ellipse. (A straight line is here treated as a special case—see definition of $r$, Equations 3 and 4.)

Special cases:
  (1) Semicircle; $\phi = 180°$
  (2) Straight line; $\phi = 180°$
  (3) Circle; $\phi = 360°$
  (4) Ellipse; $\phi = 360°$

SPECIFIC EQUATIONS

*Derivations from Equations 1 and 2*

STRAIGHT LINES

For any point along a straight line cos $\omega t = K$ (see definition of sin $\omega t$ cos $\omega t$, Equations 1 and 2 supra) where K is any distance along the line from the origin which is the center of the line and sin $\omega t = 0$.

From Equations 1 and 2 for a straight line $$X(t) = \alpha + A \cos \omega t \quad (8)$$
$$Y(t) = \beta + B \cos \omega t \quad (9)$$

where each of A or B may be positive or negative.

Figure 1:
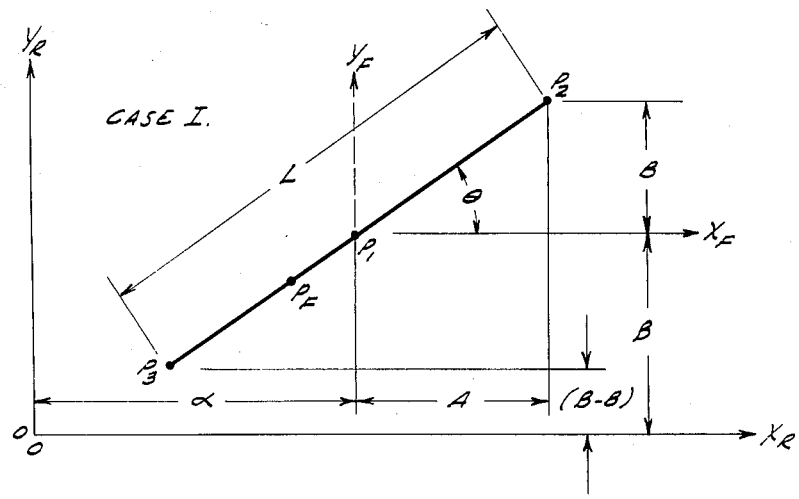
FIG. 1 is a graph of a straight line having a positive slope in which the starting point $P_2$ for drawing the line is in the first quadrant of the coordinate system therefor.

(1) Positive slope:

(a) *Case I.*—Start first quadrant of coordinate system $X_F$, $Y_F$ (see FIG. 1)

$$X_R(t) = \alpha + A \cos \omega t \quad (10)$$
$$Y_R(t) = \beta + B \cos \omega t \quad (11)$$

Figure 4:
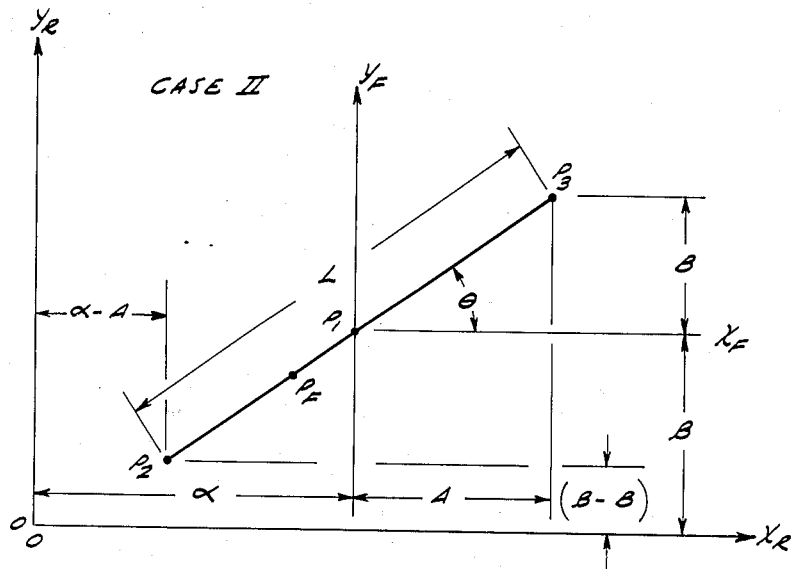
FIG. 4 is a graph of a straight line having positive slope in which the starting point $P_2$ for drawing the line is in the third quadrant of the coordinate system therefor.

(b) *Case II.*—Start third quadrant of coordinate system $X_F$, $Y_F$ (see FIG. 4)

$$X(t) = \alpha - A \cos \omega t \quad (12)$$
$$Y(t) = \beta - B \cos \omega t \quad (13)$$

Figure 7:
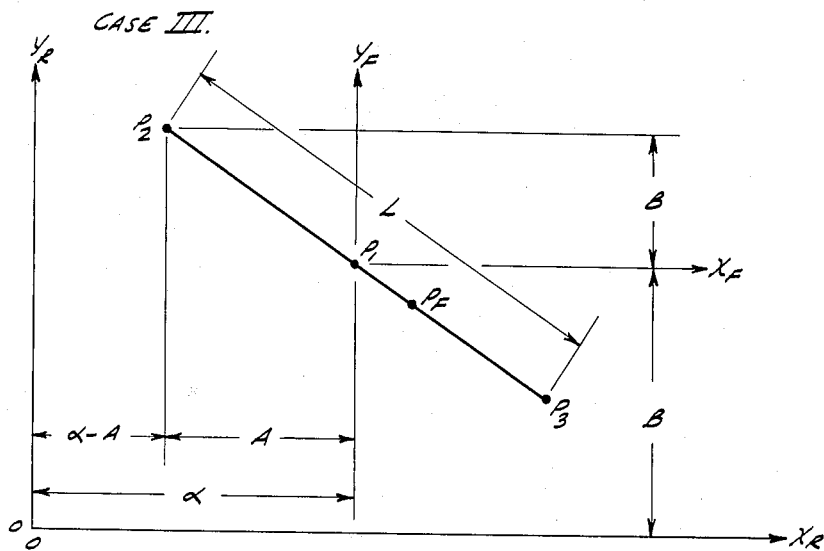
FIG. 7 is a graph of a straight line having negative slope in which the starting point $P_2$ for drawing the line is in the second quadrant of the coordinate system therefor.

(2) Negative slope:

(a) *Case III.*—Start second quadrant of coordinate system $X_F$, $Y_F$ (see FIG. 7)

$$X(t) = \alpha - A \cos \omega t \quad (14)$$
$$Y(t) = \beta + B \cos \omega t \quad (15)$$

Figure 10:
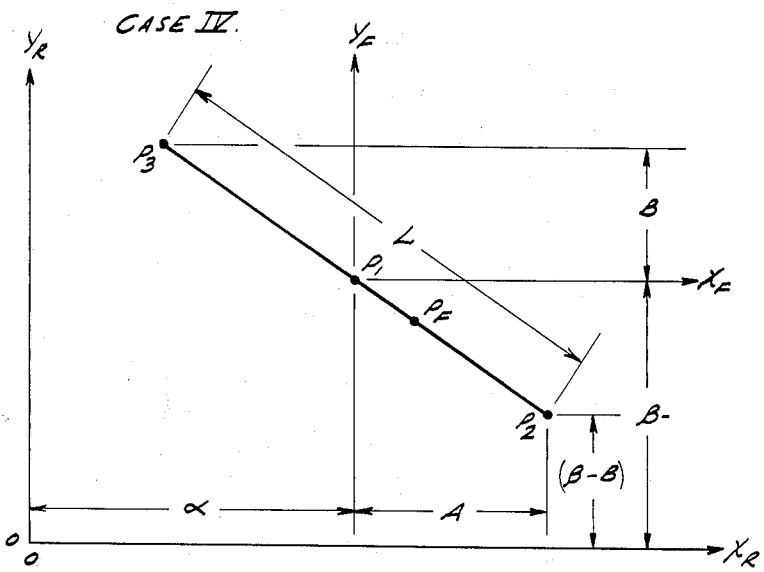
FIG. 10 is a graph of a straight line having negative slope in which the starting point $P_2$ for drawing the line is in the fourth quadrant of the coordinate system therefor.

(b) *Case IV.*—Start fourth quadrant of coordinate system $X_F$, $Y_F$ (see FIG. 10)

$$X(t) = \alpha + A \cos \omega t \quad (16)$$
$$Y(t) = \beta - B \cos \omega t \quad (17)$$

CIRCULAR ARCS AND CIRCLES (1) Start on axes $X_F$ or $Y_F$:

(a) Start positive horizontal axis ($\theta = 0°$)

$$X(t) = \alpha + A \cos \omega t \quad (18)$$
$$Y(t) = \beta + A \sin \omega t \quad (19)$$

(b) Start positive vertical axis ($\theta = 90°$)

$$X(t) = \alpha - B \sin \omega t \quad (20)$$
$$Y(t) = \beta + B \cos \omega t \quad (21)$$

(c) Start on negative horizontal axis ($\theta = 180°$)

$$X(t) = \alpha - A \cos \omega t \quad (22)$$
$$Y(t) = \beta - A \sin \omega t \quad (23)$$

(d) Start on negative vertical axis ($\theta = 270°$)

$$X(t) = \alpha + B \sin \omega t \quad (24)$$
$$Y(t) = \beta - B \cos \omega t \quad (25)$$

(2) Start in quadrants of $X_F$, $Y_F$:

(a) First quadrant ($0° < \theta < 90°$)

$$X(t) = \alpha + A \cos \omega t - B \sin \omega t \quad (26)$$
$$Y(t) = \beta + A \sin \omega t + B \cos \omega t \quad (27)$$

(b) Second quadrant ($90° < \theta < 180°$)

$$X(t) = \alpha - A \cos \omega t - B \sin \omega t \quad (28)$$
$$Y(t) = \beta - A \sin \omega t + B \cos \omega t \quad (29)$$

(c) Third quadrant ($180° < \theta < 270°$)

$$X(t) = \alpha - A \cos \omega t + B \sin \omega t \quad (30)$$
$$Y(t) = \beta - A \sin \omega t - B \cos \omega t \quad (31)$$

(d) Fourth quadrant ($270° < \theta < 360°$)

$$X(t) = \alpha + A \cos \omega t + B \sin \omega t \quad (32)$$
$$Y(t) = \beta + A \sin \omega t - B \cos \omega t \quad (33)$$

For an ellipse the dimensions of the major and minor axes are different, whence the sine and cosine functions swing between different extremes. By choice herein the ellipse, or an elliptical arc, is started on the X axis and is therefore defined by a system of equations such as (18) and (19) having differing coefficients for the functions of the angles. Since the starting point of an arc of an ellipse or of an ellipse is limited to positive or negative $X_F$, the selection of positive or negative values of B when A is positive or negative may be used to control the direction of rotation in generating the ellipse.

ELLIPSE (1) Start on positive horizontal axis ($X_F$) ($\theta = 0°$), counter clockwise generation:

$$X(t) = \alpha + A \cos \omega t \quad (34)$$
$$Y(t) = \beta + B \sin \omega t \quad (35)$$

(2) Start on positive horizontal axis ($X_F$) ($\theta = 0°$), clockwise generation:

$$X(t) = \alpha + A \cos \omega t \quad (36)$$
$$Y(t) = \beta - B \sin \omega t \quad (37)$$

(3) Start on negative horizontal axis ($X_F$) ($\theta = 180°$), clockwise generation:

$$X(t) = \alpha - A \cos \omega t \quad (38)$$
$$Y(t) = \beta + B \sin \omega t \quad (39)$$

(4) Start on negative horizontal axis ($X_F$) ($\theta = 180°$), counterclockwise generation:

$$X(t) = \alpha - A \cos \omega t \quad (40)$$
$$Y(t) = \beta - B \sin \omega t \quad (41)$$

The pairs of Equations 10 and 11, 12 and 13, 14 and 15, 16 and 17, described the four conditions herein for straight lines depicted in FIGS. 1, 4, 7 and 10. In these figures $\alpha$ and $\beta$ denote the distances in $R_R$ and $Y_R$, respectively, to the center, $P_1$, of the line having the length L. The dimensions A and B denote the distances in $X_F$ and $Y_F$, respectively, to the starting point, $P_2$, of the line. $P_3$ denotes the end of the line. Since $P_1$ is the center of the line, the ratio of B to A defines the slope of the line and is the tangent of $\theta$. To draw line L all points $P_F$ must have coordinates $X_F$, $Y_F$ which are simultaneously in the same ratio as A and B and of diminishing magnitude from $P_2$ to $P_3$.

Figure 2:
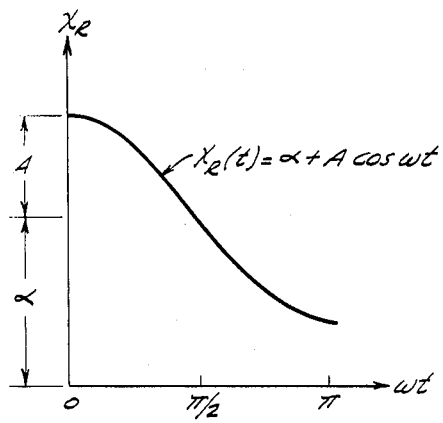
FIGS. 2 and 3 are graphs of time varying quantities depicting the instantaneous magnitudes of the coordinates of the line of FIG. 1.
Figure 3:
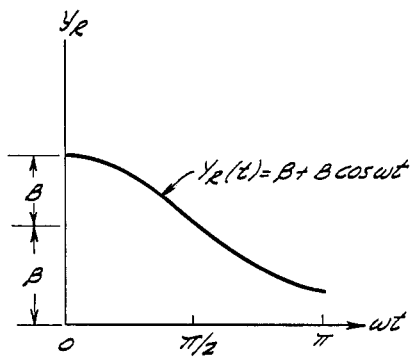

The cosine functions depicted in FIGS. 2 and 3 swing between positive and negative extremes of A and B, respectively, and consequently diminish the magnitudes $X_R$ and $Y_R$, respectively, in proper time-phase relationship to maintain the relationship $B/A = k$ for all points $P_F$ on the line L between $P_2$ (the starting point) and $P_3$ (the line termination point). In this case note that A and B are positive, i.e., added to $\alpha$ and $\beta$, respectively; hence, to draw a line of positive slope from $P_2$ to $P_3$, initially positive cosine values are selected. Equations 10 and 11 define this line.

Figure 5:
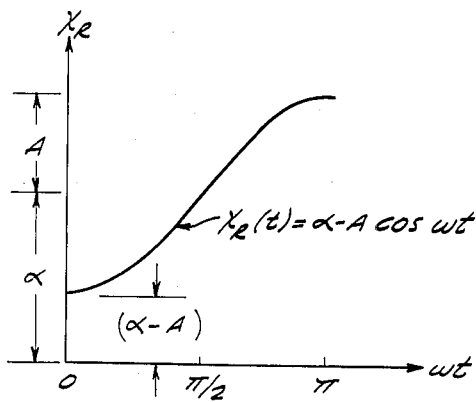
FIGS. 5 and 6 are graphs of time varying quantities depicting the instantaneous magnitudes of the coordinates of the line of FIG. 4.
Figure 6:
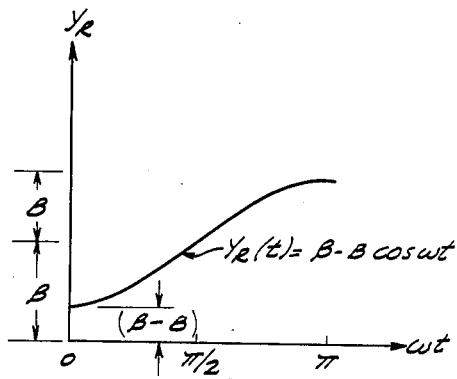

In Case II (FIG. 4) $P_2$ is in the third quadrant of $X_F$, $Y_F$ and $P_3$ is in the first quadrant and the line slope is again positive, defining a condition the reverse of that of Case I (FIG. 1). $P_2$ in the coordinate system $X_R$, $Y_R$ is now defined ($\alpha - A$) and ($\beta - B$), respectively. FIGS. 5 and 6 depict the function $X_R(t)$, $Y_R(t)$ for this condition in which the coordinates of all points $P_F$ are increasing cosine functions of both A and B, swinging between $-A$, $+A$ and $-B$, $+B$, respectively (Equations 12 and 13).

Figure 8:
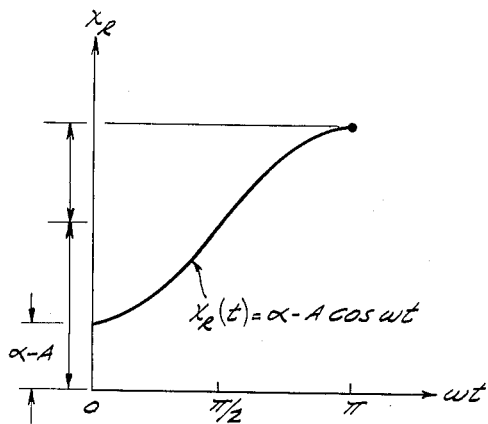
FIGS. 8 and 9 are graphs of time varying quantities depicting the instantaneous magnitudes of the coordinates of the line of FIG. 7.
Figure 9:
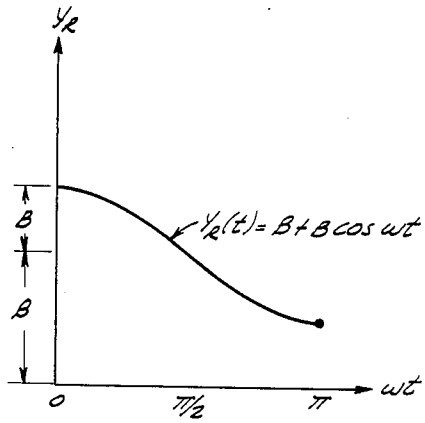

Cases III and IV (FIGS. 7 and 10) cover the two conditions for drawing a line of negative slope. In each case $X_F(t)$ and $Y_F(t)$ are oppositely changing cosine functions, i.e., in Case III $X_F(t)$ is a cosine function swinging between $-A$ and $+A$, while $Y_F(t)$ also a cosine function, swings between $+B$ and $-B$. FIGS. 8 and 9 graphically depict Equations 14 and 15 defining this condition.

Figure 11:
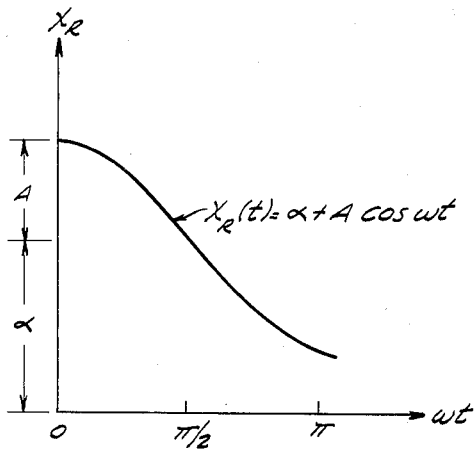
FIGS. 11 and 12 are graphs of time varying quantities depicting the instantaneous magnitudes of the coordinates of the line of FIG. 10.
Figure 12:
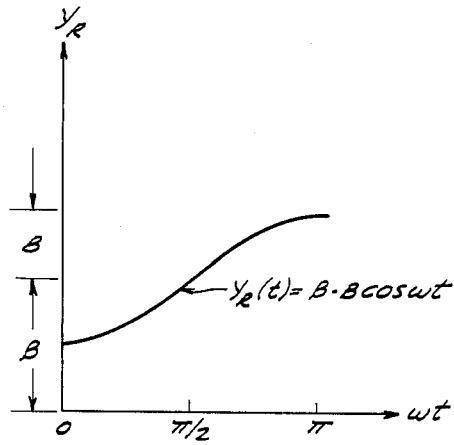

Case IV is the reverse of Case III. FIG. 10 shows the starting point $P_2$ of the line in the fourth quadrant of $X_F$, $Y_F$ and the terminating point $P_3$ in the third quadrant. A is initially positive and B is initially negative. Equations 16 and 17 defining this condition are depicted in FIGS. 11 and 12 in which $X_F$ varies between the extremes $+A$ and $-A$, while $Y_F$ varies between $-B$ and $+B$.

The line terminating function $Z(t)$ has been defined as a sinusoidal quantity used to terminate sin $\omega t$ or cos $\omega t$ at any selected value of $\omega t$ in one full cycle, one full cycle being 360°, as $Z(t)$ goes through zero from positive to negative, or the reverse, depending upon system requirements. With reference to Equations 5, 6 and 7 for a straight line $\phi=180°$. Also, $r=\frac{1}{2}L$ which is arbitrarily assigned the value 1. From (6), $C=1$ and from (7), $D=0$, whence, from (5), $Z(t)=C \sin \omega t$. This is plotted through $\omega t=\pi$ radians in FIG. 13, showing (from the definition of $Z(t)$ above) the termination of $\omega t$. This applies to each of Cases I through IV.

Sets of simultaneous Equations 18 and 19, 20 and 21, 22 and 23, 24 and 25, describe the four special cases in which circular arcs or circles are started on the respective sections of the axes $X_F$ and $Y_F$. In each instance, the $X_F$ and $Y_F$ coordinates of $P_F$ are expressable as a single product of one of A or B and $\sin \omega t$ or $\cos \omega t$. These equations have not been graphed and will be clearly understood from the explanations of a more general case which follows.

FIG. 14 depicts such a general case. Here, $\theta$ is an angle having its terminating side in the first quadrant, whence $P_2$, the starting point of a circular arc, is in the first quadrant of $X_F$, $Y_F$. $P_3$, the terminating point, is in the second quadrant. $\phi$ denotes the angle of arc and $r$ denotes the radius of the arc. $P_F$ is any point on the arc having the instantaneous coordinates $$X_F(t)=A \cos \omega t - B \sin \omega t \quad (42)$$
$$Y_F(t)=A \sin \omega t + B \cos \omega t \quad (43)$$

where assigned values of the quantities A and B may be positive or negative depending upon the quadrant in which the starting point $P_2$ is located. Since the functions $\sin \omega t$, $\cos \omega t$ are generated independently of $\theta$, respective different sine and cosine functions of $\omega t$ must be generated which are shifted in phase by an amount $\theta$ to provide the required values of $X_F(t)$ and $Y_F(t)$ at $P_2$ time zero ($\omega t=0°$ or $180°$). Equations 36 and 37 define this condition. Graphically, these equations define a transformation of the coordinate system A, B by rotation in the amount $\theta$ or, stated otherwise, define a shift of phase of $X_F(t)$ and $Y_F(t)$, the cosine and sine varying functions of $\omega t$, respectively, achieved by algebraically or graphically summing the individual terms in $\omega t$ in the respective expressions. FIGS. 15 and 16 show these conditions. Note that $X_F(t)$ and $Y_F(t)$ are shifted to the left by an amount $\theta$. $\theta$ in this case, for purposes of illustration, has been set equal to 30°. The radius $r$ may, for illustrative purposes, be any value, say 8 units, in which case, from (3) and (4), $A=4$ units and $B=6.93$ units. Corresponding points on $X_F(t)$ and $Y_F(t)$ define the coordinates of $P_F$ at any selected instant. It is to be understood that $X_F(t)$ and $Y_F(t)$ are algebraically summed with $\alpha$ and $\beta$, respectively, although not completely shown in FIGS. 15 and 16.

The angle $\phi$ represents the number of degrees in the circular arc between the starting point $P_2$ and the terminating point $P_3$. Terminating point $P_3$ is in the second quadrant. The quantity, $X(t)$, Equation 5, is the line terminating function. As a specific example, if $\phi=120°$ and $r=8$ units, from (6) and (7), $C=4$ units and $D=6.93$ units. FIG. 17 shows the plotting of these functions from which $Z(t)$, a sine varying function of $\omega t$, is obtained. Note that $Z(t)$ goes through zero from positive to negative at the point $\phi=120°$ and defines the length of the arc.

FIG. 18 is a graph of $Z(t)$ for $\phi=210°$; $r=1$. Here, $C=6.93$ units and $=D=-4.0$ units. Graphically summing the plots of $C \sin \omega t$ and $-D \cos \omega t$ results in $Z(t)$ which passes through zero going from positive to negative at 210°. $P_4$ depicts this termination point in FIG. 14. Only the ratio of C to D is important, i.e., C and D need not be numerically scaled to define the coordinates of lines, radii, etc., as are A and B. Hence, $r$, in determining $Z(t)$ may always be unity, regardless of the value of $r$ in computing A and B.

FIG. 19 shows a circle in the reference plane having a starting point $P_2$ on $X_F$. It is convenient to start a circle of $X_F$ where $A=r$ which simplifies programming. Equations 18 and 19 which define this situation are graphed in FIGS. 20 and 21. In this situation $\omega t$ is generated from 0° to 360° and $\phi=360°$.

For this condition, from (6) and (7), $C=-1$ and $D=0$. Hence, $Z(t)=-C \sin \omega t$ which is plotted in FIG. 22 and passes through zero going from positive to negative at 360°, defining the terminal point $P_3$ at $P_2$, the starting point, to complete the circle. Pairs of Equations 20 and 21, 22 and 23, 24 and 25 define circles started and ended on positive $Y_F$, negative $X_F$ and negative $Y_F$, respectively. In these situations $r=B$, $r=-A$ and $r=-B$, respectively.

In the interest of simplicity, ellipses or elliptical arcs will always be started on positive or negative $X_F$. $A \neq B$. A is always measured along $X_F$ and B along $Y_F$. If $A>B$, the major axis of the ellipse is on $X_F$ (FIG. 23). If $A<B$, the major axis of the ellipse is on $Y_F$ (FIG. 26). In this case $\theta$ always equals zero. Although the elliptical arc may be terminated at any point, i.e., $\phi<360°$, it will be assumed that $\phi=360°$ for defining a complete ellipse so that $P_2$ and $P_3$ coincide. Equations 34 and 35 define $X_R(t)$ and $Y_R(t)$ for the special case above. FIGS. 24 and 25 plot $X_R(t)$ and $Y_R(t)$ for $A>B$ and FIGS. 27 and 28 plot $X_R(t)$ and $Y_R(t)$ for $A<B$. $Z(t)$ is the same as for a circle and may be seen by reference to FIG. 22.

Elliptical arcs or ellipses may be drawn in either direction from starting points on positive or negative $X_F$.

Since the starting point of an ellipse or of an elliptical arc is limited to positive or negative $X_F$, the sign of B may now be used to designate a direction of rotation in generating the line. Positive values of B result in generating lines from starting points $P_2$ on positive or negative $X_F$, having positive components in $X_Y$. Hence, from $P_2$ in positive $X_F$ when B is positive, the rotation is counterclockwise. When $P_2$ is in negative $X_F$, rotation is clockwise. When B is negative, rotation from positive $X_F$ is clockwise, and from negative $X_F$, rotation is counterclockwise. Equations 34 through 41 cover these four conditions.

For an elliptical arc the line termination function as described for the circular arc applies (see FIGS. 17 and 18 and the description therefor).

Note is made at this point that in drawing an ellipse the quantity B is inhibited in the system during the slewing mode of operation so that slewing to starting points on $X_F$ defined by $\alpha+A$ and $\beta$ is achieved. That is, although a value B is programmed, unlike positioning at starting points $P_2$ in drawing straight lines or arcs, where A and B when programmed are used to define $P_2$, B is now inhibited in slewing and appears only in the term $B \sin \omega t$ when the line is being drawn.

It should be noted that all of the time variable quantities as described hereinabove are inverted when employed in the system. $\alpha$ and $\beta$ appear as negative voltages. The quantities, A, B, C, and D, when programmed as positive quantities actually result in negative time varying voltages. Sign changes are therefore consistent and the relationships of the quantities are unchanged from these set forth. The explanations as made facilitate both derivation and explanation of the several quantities.

The system is generally depicted in the block diagram of FIG. 29 which incorporates facilities for computing the various mathematical relationships described and graphed hereinabove in an electrical system of control wherein suitable output voltages are provided to move and position an output member to describe a geometric figure of the type defined by a particularly selected expression.

The arrangement includes a conventional magnetic tape reader which is generally designated TR and which includes a magnetic tape on which the input information to the system is suitably encoded. This will be described at a later point. The output of the tape reader is applied to a suitable, conventional type of pulse conversion circuit generally designated PC, the details of which are not illustrated in the interest of simplicity. This circuit converts the A.-C. magnetic head voltages to unidirectional voltage pulses suitable for driving flip-flops and applies the voltage pulses as inputs to a flip-flop type of shift register SR. The information for a particular figure which is to be drawn is contained in a complete block of information on the tape. FIG. 30 shows the tape format. This entire block of information is read and shifted into the shift register which produces the output signals, CA, for circular arc, EL, for ellipse, $\alpha$, the distance in $X_R$, $\beta$, the distance in $Y_R$, both $\alpha$ and $\beta$ denoting distances to the geometric center of the figure which is to be drawn, the C and D functions which are utilized to provide an indiction of the end of a particular line, and the A and B signals indicating the coordinates in $X_F$ and $Y_F$, respectively, from the geometric center of the figure to the starting point $P_2$ of the line describing the figure.

These output signals are selectively combined in a suitable digital to analog circuit represented by the block identified DAC, to produce respective output voltages $E_X$ and $E_Y$ which at any instant respectively indicate the coordinates $X_R$, $Y_R$ in the reference plane, of particular points on the line describing the figure.

These output voltages are applied to an X—Y plotter involving a pair of position type servo systems having respective output motors for powering the output member in mutually perpendicular coordinate directions, the output member being connected to both of the motors to be controlled thereby. The digital-to-analog converter, DAC, also produces another time varying output voltage generally designated $E_Z$ [$Z(t)$ inverted] the time duration of which in passing through zero from a negative value to a positive value determines the length of a line. This voltage is related to the voltages $E_X$ and $E_Y$, as indicated in the equations hereinabove, through suitable functions of $\omega t$, the common parameter.

The digital-to-analog converter circuit is additionally controlled by a function generator, generally designated FG, which produces time varying voltages, $+E_R \sin \omega t$, $-E_R \sin \omega t$, $+E_R \cos \omega t$ and $-E_R \cos \omega t$.

As discussed hereinabove, these time varying voltages are selectively combined to produce the time varying voltages $E_X$ [$X(t)$ inverted] and $E_Y$ [$Y(t)$ inverted] in the digital-to-analog converter. Details of this will appear hereinafter. For the moment, the function generator may be described generally as a double integrator type of oscillator circuit the frequency $\omega$ of which is controlled by suitable attenuating networks. The attenuating networks in turn are controlled by selected discrete signals of the quantities A and B from the shift register whereby the frequency of the function generator is roughly inversely proportional to the length of the line to be drawn. Selected signals of the quantities A and B are additionally applied along with the signal, $$-E_R \cos \omega t$$

to an analog control circuit AC which produces an output signal for controlling the pin on the X—Y plotter. This pen, as will be described, is movable between retracted and pen down, or drawing, positions. In the pen down position the pen engages the surface of the drawing board so that a line may be drawn. This pen down signal is terminated by the signal $E_Z$ and/or other signals identifying line characteristics which determine the specific character of a line which is to be drawn, that is, a dash line, a center line, a phantom, or section, line, etc.

Provision is made in this system for slewing the pen in the reference plane to the starting point of a line describing the geometric figure which is to be drawn. Under this circumstance the pen is to be maintained in retracted position. For this purpose X error and Y error signals, XE and YE, respectively, are derived from the motor circuits, or other circuits associated with the motor circuits of the X—Y plotter, and the larger of these two signals used to prevent lowering or dropping of the pen into engagement with the surface of the drawing board until such time as the slewing operation has terminated and the pen has satisfactorily settled in drawing position at the starting point, $P_2$, of the line which will describe the figure to be drawn.

A digital control circuit DC receives control signals from the shift register circuits. These signals indicate that the tape reader TR may be started, or that the tape has been read and the information is stored in the flip flops and that the tape is to be stopped. Drawing identification and line identification signals DA and LA, respectively, also form a part of the control signals.

A pen instruction which determines the width of a line which is to be drawn is also included. In connection with this latter instruction, a plotting board, such as is herein provided, may include more than one drawing pen, in which case a line width instruction, or pen instruction, may identify a particular one of several different pens. Since these pens are not conveniently situated at precisely the same point provision is made in such an arrangement for a parallax correction. This is discussed in the description of the X and Y servos hereinafter. Alternatively, an adjustable pen or a mechanism to index a selected pen at a precise drawing position may be employed.

The analog control circuit AC produces an output signal at the completion of a particular figure. This is indicated as "Figure Complete." This output signal is applied to the digital control logic and is used to reset the system.

The system is illustrated in greater detail in FIGS. 31a, 31b and 31c viewed together. The organization of these different figures is represented in FIG. 31. FIG. 31a, with reference to the shift register SR, indicates the full complement of signals which is to be generated by the digital portion of the system. This includes, in addition to those indicated in FIG. 29, the signals AS$n$, BS$n$, CS$n$ and DS$n$. This group of signals denotes, respectively, the signs positive or negative of the A, B, C and D signals.

This information, as illustrated in the tape format, FIG 30, is encoded on a tape which may include seven different columns. One practical embodiment of this invention employs a magnetic tape and magnetic tape reader. This invention is described in accordance with such an arrangement. The tape is divided into longitudinal sections respectively designated $\alpha$, $\beta$, A, B, C, D, LA and DA. The characters LA and DA designate line address and drawing address, respectively. Each of the signals $\alpha$ through D are identified by 14 bits of information, which are weighted according to the convention, $2^{-1}$ through $2^{-14}$, for each of the 14 bits. The numerical designations in the squares of the tape format, equal X in the expression $2^{-X}$ which denotes the ratio of full scale value. The selection of this notation is necessitated by the requirements of the analog to digital converter which will be described hereinafter.

Inasmuch as $\alpha$ and $\beta$ are dimensions in the coordinates $X_R$ and $Y_R$, respectively, of the reference plane, in which $X_R=0$ and $Y_R=0$ is in the lower left corner, the signs of $\alpha$ and $\beta$ are always positive; hence, a sign indicating signal is not needed for these quantities. Each section of information $\alpha$, $\beta$, etc., involves five columns of information extending through three rows providing positions for 15 bits of information. The 15th or $2^0$ bit of information in the $\alpha$ information section of the tape is used to designate a circular arc, identified CA in the tape format. This has place significance on the tape and is connected with a particular channel of the shift register to be stepped to a particular flip flop. Similarly, in the $\beta$ information section the space EL designates the ellipse. The presence of a magnetic spot here indicates that an ellipse is to be drawn. In the information sections for the quantities A, B, C and D, the extra space for recording of information is used to designate the sign of the respective quantities. The absence of a magnetic spot in any one of the spaces designated SN indicates the number is positive. The presence of a magnetic spot indicates the quantity is negative.

The line address section LA may be organized in any convenient manner. Fifteen information recording spaces are available for recording data as to a particularly selected line. Each line of a specific drawing has a particular number. Hence, any line of a drawing may be selected by the line identification code. The section DA, set aside for the drawing address includes 10 spaces for recording of information, one of which is designated $B > A$ and is used in one embodiment of this invention to control the application of selected discrete signals of the quantities A or B, whichever represents the quantity of greater magnitude, to the function generator attenuator networks for the purpose of controlling the frequency, $\omega$, of the output. A slow pen represented by the character SP may also be programmed here. When more than one drawing is recorded on a tape, the drawing code identifies each drawing.

The last recorded row of information includes the space marked TK and TN denoting thick pen and thin pen, respectively, PH for phantom line, HI for hidden line, and CE for center line.

The tape is read from left to right as viewed in FIG. 30 so that the last row of information which is read and which is stepped into the shift register will be that row of information including the designation CA for circular arc. The system is synchronized by means of a clock pulse train which is generated from a clock pulse column of the tape. This is designated as column 4 but may be any column thereon. The tape sprocket is conveniently used for this purpose in many instances.

Additionally, provision may be made for parity checking. Lateral parity checks may be made in a column of the tape here designated column 7 and may be odd or even as desired. Similar considerations apply also to longitudinal parity which may be even or odd as desired. Such features are not covered herein.

Any conventional type of shift register may be employed. This is shown only in block form in FIG. 31a. One suitable type is schematically represented in FIG. 32.

Such a shift register may include 5 flip flop channels, each comprising 24 flip flops in correspondence with the number of information rows on the tape. These flip flops are designated 1F1 through 1F24, 2F1 through 2F24, 3F1 through 3F24, 5F1 through 5F24 and 6F1 through 6F24. The first digit of each of these designations corresponds to the column of the tape with which it is associated. The tape reader is schematically represented at the top of this figure and comprises a plurality of tape reading heads H1, H2, H3, H5 and H6 for each of the information columns and a head H4 for the clock pulse column of the tape. The outputs of these heads may be applied through suitable pulse shaping circuits PC1, PC2, PC3, PC5 and PC6 to respective asynchronous flip flops which are controlled as to frequency by the rate at which the tape is operated and which are rapidly reset in the interval between each tape information row by a suitable gated delayed clock pulse GCP as indicated, whence, subsequent to the setting of one of these flip flops by reading of information from the tape, the subsequent clock pulse application resets the flip flop to restore it for the next information row on the tape.

These asynchronous flip flops are called read flip flops and are identified 1RF, 2RF, 3RF, 5RF and 6RF. Their respective outputs are applied to the inputs of correspondingly numbered flip flops of the shift register channels. The output of the clock pulse read head H4 is similarly coupled to a pulse converter or pulse shaping circuit PC4 producing a clock pulse CP. Clock pulse CP is coupled to an asynchronous clock pulse driven flip flop CPF which develops a clock pulse synchronized voltage state signal for system timing. This signal is applied to a suitable delay circuit which may include a one shot multivibrator which drives a clock pulse generator CPG producing a delayed clock pulse DCP. This delay is to insure the proper setting of the read flip flops which may be delayed (relative to the clock pulse signal) due to skewing of the tape during reading. The clock pulse generator output is also applied to an "and" gate (see FIG. 39), the other input of which is controlled by a shift control flip flop, FQ1, which produces the gated clock pulse signal, GCP, applied to the flip flops of the shift register, SR, to switch these flip flops in suitable time phase synchronism with the incoming information to shift the information through the respective flip flops of the respective channels until the tape is completely read and the shift register is full of the information from the tape.

The type of shift register circuit which may be employed is depicted in part in greater detail in FIG. 33 which shows the first few flip flops in each of the 5 columns. These are standard flip flop circuits having two input and two output circuits. The outputs of the read flip flops are applied to the respective inputs of each of the flip flops 1F1, 2F1, 3F1, 5F1 and 6F1 to switch these flip flops in synchronism with the switch of the outputs of the asynchronous flip flops. The corresponding outputs and inputs of the successive flip flops are coupled together through "and" gates which gate clock pulses GCP whenever the flip flop signals thereon are at gating voltage level, to form five shift register channels. There is a finite delay in the switching time of each flip flop. Reading of the tape is synchronized with the flip flop switching period by the gated clock pulses GCP so that information is read from the tape and stepped in sequence through the shift register. Thus, the magnetic heads H1, H2, H3, H5 and H6 drive the respective read flip flops which in turn, through the pulse conversion circuits, drive the respective flip flops of the first row of the shift register. Thereafter the information in the first row of flip flops is stepped to the second row of flip flops with the occurrence of the gated clock pulse signal GCP for the shift register. This sequence continues until the tape is completely read, at which time the information in the tape is stored in the respective flip flops. Suitable amplifiers (not shown) associated with each of the flip flops may be employed to provide electrical outputs as required.

Before reading the tape, flip flop 1F1 is set to its 1Q1 state (its "1" representing state) and flip flops 1F2 to 1F24 are set in their "0" representing states, $1\bar{Q}2$, $1\bar{Q}3$, etc. On the 23rd clock pulse the "1" stored in flip flop 1F1 is shifted into flip flop 1F24 which changes to its "1" representing electrical state, 1Q24. As will be explained at a later point, this signal is used to generate a tape stop signal at the time the 26th clock pulse occurs (FQ7 is switched to its "1" state), if the system is not in its line selection or drawing selection modes of operation, or if in such modes if a signal indicating line or drawing coincidence exists. The other shift register flip flops are not pre-set prior to reading the tape. FIG. 33 shows resetting signals applied to the K input terminals for setting these other flip flops in their "0" or $\bar{Q}$ electrical states.

As will be seen by reference to FIGS. 32 and 33, after the tape has been completely read and all the information has been shifted into the shift register, the first row of flip flops contains the information in the row of the tape which was last read. Hence, flip flop 1F1 is set according to the information in the space on the tape marked CA and will produce a signal on its "1" representing output terminal 1Q1, for instance, when a circular arc is desired. If there had been no magnetic spot recorded in the spot CA on the tape the flip flop would have been in its zero representing state with terminal $1\bar{Q}1$ high and terminal 1Q1 would have been at the other, or, the lower one of its two voltage states. Similar considerations apply to the information stored in flip flops 2F1, 3F1, 5F1 and 6F1 producing electrical output signals $\alpha^{-1}$, $\alpha^{-2}$, $\alpha^{-3}$ and $\alpha^{-4}$. The second row of flip flops 1F2, 2F2, 3F2, 5F2 and 6F2 produces electrical signals $\alpha^{-5}$, $\alpha^{-6}$, $\alpha^{-7}$, $\alpha^{-8}$, $\alpha^{-9}$ and the third row of flip flops 1F3, 2F3, 3F3, 5F3 and 6F3 produces electrical signals, $\alpha^{-10}$ through $\alpha^{-14}$, which covers all of the digital information for the $\alpha$ information group. These are bi-level signals.

Similar considerations apply to the $\beta$, A, B, C, D, etc., sections of the register. These are not illustrated in FIG. 33 in the interest of simplicity.

In the combined showing of FIGS. 31a through 31c the outputs of the shift register designated as quantities $\alpha$, $\beta$, A, B, C, D, line address, LA, drawing address, DA, and pen instruction, are represented as single conductors. These will be understood to represent cables including as many conductors as are necessary to handle all of the discrete signals which are present in a single quantity. As will be seen, these signals are applied to the relays of the respective ladder sections $L_a$, $L_\beta$, LA, LB, LC and LD and are employed to set particular relays associated with each of these signals. Selected discrete signals of the quantities A and B are also applied to relays K1 through K5 in the attenuator sections of the function generator FG for controlling the frequency $\omega$ of the time varying output voltages. These selected signals are indicated at the bottom of the shift register SR in FIG. 31a and are designated, respectively, $A^{-2}$ through $A^{-6}$ and $B^{-2}$ through $B^{-6}$. Additionally, the circular arc command signal CA is applied to this relay group for a purpose to be explained hereinafter. Relay K6 is controlled by the line characteristic signal LCH or by a tape initiated slow pen signal SP and, by itself, reduces the frequency $\omega$ of the function generator by about 3:1.

The several ladder networks illustrated are typically represented by a detail showing of one of the ladders in FIG. 34. This may be referred to as the ladder LA for convenience and comprises attenuator sections LA1 and LA2, respectively, which are selectively controlled by the "a" contact group and the "b" contact group, respectively, of relays AR1 through AR14. Relays AR1 through AR14 in this instance are controlled by the application of signals such as $A^{-1}$ through $A^{-14}$ designating as a group by their electrical configuration in one or the other of their two voltage states a particular magnitude of the quantity A which, it will be recalled, designates a particular distance $X_F$, as described. Two networks are employed to provide electrical isolation between outputs from the LA1 and LA2 sections since these are used in generating the $E_X$ and $E_Y$ voltages, respectively. However, the LA1 and LA2 sections are identically set in correspondence with a selected magnitude represented by the quantity A.

A network of this general type is completely described in Patent No. 2,718,634. The circuit of FIG. 34 differs from the patented circuit in the use of separate resistors in the contact circuits between one pole of each contact and ground and the other pole of each contact and the input signal terminal $E_S$, in each instance. In the patent a single resistor is connected in the circuit between the individual contacts and the tapped sections of the resistor attenuator. The resistors, as shown, prevent shorting the signal $E_S$ to ground in the event make-before-break at any contact should occur.

The network provides attenuation of a time varying or fixed supply voltage $E_S$ applied to the network, dependent upon the energization pattern of the relays AR1 to AR14. FIG. 34 indicates the application of a supply or signal voltage $E_S$ to each of the input terminals. It will be appreciated that this need not be a fixed positive voltage. The voltage may also be a negative voltage with respect to ground. Additionally, as will be seen hereinafter, time varying signal voltages are applied to the input terminals of the resistor attenuators of the ladder networks LA, LB, LC and LD to be amplitude modulated in accordance with the setting of the resistor attenuators. The networks LA1 and LA2 are grounded and their electrical outputs are zero when all of the relays are de-energized.

The function generator FG is illustrated in FIG. 35. This is a double integrator type of oscillator circuit, the peak amplitude of which is determined by finite reference voltages and the frequency of which is controlled in accordance with the writing speed limitations of the plotter. The function generator includes respective high gain, low drift integrator amplifiers IA1 and IA2, respectively shunted by integrating capacitors C1 and C2, and respective operational amplifiers OA3 and OA4, the latter functioning primarily as inverters in the circuit and providing unity gain. A circuit of this type is known in the art and is conventionally employed as an oscillator.

The circuit illustrated differs from prior art arrangements in that the inputs to the integrating amplifiers IA1 and IA2 comprises the variable resistor attenuator networks RA1 and RA2, respectively. These networks each comprise individual series connected resistors, each of which may be shunted according to a predetermined pattern of discrete signals $A^{-2}$ through $A^{-6}$, or $B^{-2}$ through $B^{-6}$, depending upon which of B or A is the greater, as indicated in the space provided on the tape, in the tape format. The output of amplifier IA1 is connected by a resistor R1 to the input of the resistor attenuator network RA2. The output of amplifier OA4 is coupled through a resistor R2 to the input of the resistor attenuator network RA1 to complete the loop. The resistance of the respective networks is controlled by the contacts of relays K1, K2, K3, K4 and K5. These relays are energized by the individual signals of the quantities A or B, depending upon a relay K51. If the quantity A is greater than the quantity B this relay is de-energized and the respective A signals are applied to the relays K1 through K5. On the other hand, if the quantity B is greater than the quantity A, relay K51 is energized and the respective signals of the quantity B individually control the energization of the respective relays K1 to K5. The "a" contacts of the respective relays control the shunting of the resistor sections of the resistor attenuator network RA1 and the "b" contacts of this group of relays control the shunting of resistors of the resistor attenuator network RA2. These are set in exactly the same ratio to maintain the desired unity relationship between the sine and cosine output voltages of the generator. The $\omega$ is controlled by setting the attenuator networks to an approximation of half of the length of a straight line, or the radius of a circular arc, or half the length of an axis of an ellipse, as the case may be. The outputs are represented at their respective output terminals as follows: terminal T1, $-E \cos \omega t$; terminal T2, $+E \cos \omega t$; terminal T3, $+E \sin \omega t$; and terminal T4, $-E \sin \omega t$.

Relay K7 controls the operation of this function generator. In its de-energized condition the contacts K7a and K7b connect the input circuits of the amplifiers IA1 and IA2 through resistors R3 and R4 to $-48$ volts and ground, respectively, and when relay K7 is de-energized terminals T1 and T2 are approximately $-48$ volts and $+48$ volts, respectively. Terminals T3 and T4 are at zero or ground potential. The function generator is now caged and is reset. During this interval relays K1–K6 are selectively energized setting the attenuators RA1 and RA2 to establish the loop gain of the function generator and thereby control the frequency of oscillation. When the relay K7 is energized contacts K7a and K7b connect the integrators IA1 and IA2 and the amplifier OA4 in a loop to form a double integrator oscillator which "free runs" and generates an output voltage having an amplitude governed by the reference voltage ($-48$ volts) and a frequency determined by the setting of the attenuator networks RA1 and RA2. In one embodiment the frequency is controlled over a range of 0.5 rad/sec. to 8.0 rads/sec. in five steps which maintains writing speed at about 4 in./sec.

Each integrating amplifier is provided with a convergence-divergence network CN. These networks have respective convergence potentiometers CP1 and CP2 having adjustable taps which are each resistor coupled to the input circuits of the respective integrator amplifiers forming feedback loops to compensate leakage resistance of the adjustable integrating capacitors C1 and C2. Adjustment of the potentiometer taps compensates this condition. This adjustment is made by programming a circle and noting whether the line diverges or converges radially and thereafter adjusting CP1 and CP2 to achieve closure.

There is one other way in which the frequency of oscillation of the function generator is controlled. This is provided by a relay K6 which includes a pair of normally open contacts K6a and K6b. These contacts shunt respective resistors R5 and R6 forming part of the terminating impedances of the respective networks RA1 and RA2. These resistors R5 and R6 are selected of such value that when relay K6 is energized, network attenuation is changed in an amount to reduce the frequency of oscillation, $\omega$, by about 3:1. As indicated, this relay is controlled by a slow pen signal designated SP which may be programmed on the tape and coupled to the coil of relay K6 through an appropriate flip flop in the shift register and circuits associated therewith. This relay may also be controlled by a contact K16a of a relay K16 (see FIG. 31a). Relay K16 is energized at any time that a line character signal LCh exists for a dotted or dashed line, center line, section line, or any broken line where it is desirable to reduce pen speed. Under these circumstances contact K16a is closed which energizes relay K6 to appropriately change network attenuation.

An alternative arrangement for controlling the energization of relays K1 through K6 is illustrated in FIG. 36. The arrangement here provides a different setting of the attenuator networks than is obtained with the arrangement illustrated in FIG. 35. This offers an advantage in the sense that it is unnecessary for the programmer to note in advance that B is greater than A and record this as a magnetic spot in the appropriate position on the tape. As seen in FIG. 36, the signals $A^{-2}$ and $B^{-2}$, $A^{-3}$ and $B^{-3}$, $A^{-4}$ and $B^{-4}$, $A^{-5}$ and $B^{-5}$, $A^{-6}$ and $B^{-6}$ are coupled in the pairs indicated to the coils of the respective relays K1, K2, K3, K4 and K5 in individual circuits, each including a respective one of the series polarizing diodes D1a, D1b, D2a, D2b, D3a, D3b, D4a, D4b, D5a, D5b. Additionally, relay K5 has applied thereto the circular arc signal CA through a separate polarizing diode D5c. Relay K6, which is again used to reduce the frequency, $\omega$, by about 3:1, has a first signal designated SP coupled thereto by a diode D6a, and a second signal LCh, the line characteristic signal coupled thereto through a diode D6b. The slow pen signal SP may be derived from the tape, as aforesaid, through a corresponding shift register flip flop and circuits associated therewith.

With the circuit arrangement shown in FIG. 36 it will be apparent that if both of the quantities A and B exist the relay network will be controlled by the discrete signals of both of the quantities. Under some circumstances a straight line may be drawn on $X_F$, or a circular arc started on $X_F$, either positive or negative. In this circumstance the quantity A exists but there is no quantity B. The relays are therefore controlled solely by the discrete signals of the quantity A. Similarly, if a straight line is drawn on, or, a circular arc is started on the $Y_F$ axis only the quantity B will be in existence and the relays will be controlled exclusively by the discrete signals of the quantity B. Under still another circumstance, if a line or circular arc is to be started at a point in which $A=B$, both of the quantities exist and the discrete signals of both of the quantities will appear simultaneously on the two inputs of certain of the relays. For other conditions when A and B are not equal, there will be a different application of signals. The arrangement here is such as to provide a control of the attenuators approximating the longest length of line, as represented by the approximation of the coordinates in $X_F$ and $Y_F$ afforded by the selected signals of the quantities A and B.

In one embodiment of this invention, the reference voltages which are applied to the ladder attenuators LA and LB of the digital-to-analog converter circuits are negative voltages. Similarly, negative voltages are employed in the function generator. Hence, the outputs of these networks as combined in the summing junctions XJ, YJ and ZJ, if expressed in terms of numerical values of voltages as generated would result in values of voltages $E_x$, $E_y$, etc., which are inverted relative to those shown in FIGS. 1 to 28. However, these voltages are thereafter inverted in the respective summing amplifiers XSA, YSA and ZSA shown in FIG. 31b. Hence, the discussions herein will refer to the voltages appearing at the outputs of these respective amplifiers.

The convention is adopted herein that sign representing relays K47, K48, K49 and K50 controlled by respective sign signals AS$n$, BS$n$, and DS$n$ will be normally de-energized when the corresponding quantity A, B, C, or D is positive. When the quantity is negative, a magnetic spot is applied to the tape in the appropriate position to generate a signal necessary to energize the selected relay to thereby invert the time varying voltage which is selected.

The equations which follow, instead of being written in negative terms as appearing at the respective summing junctions, are written in positive terms, and for practical purposes represent the respective outputs of the summing amplifiers. Hence, each negative term as generated is a positive term in the equation as written, and each positive term as generated is a negative term in the equation as written.

When straight lines are to be drawn, both the circular arc relay K21 and the ellipse relay K22 are de-energized. Contacts K21a and K21b of the circular arc relay ground the input circuits of the attenuator networks LA2 and LB1 leaving only the attenuator network LA1 applicable in generating the $E_x$ voltage, that is, functioning with associated circuits as a circuit means coupling one output of the functioning generator FG to the motor XM, and the attenuator LB2 applicable in generating the $E_y$ voltage, that is, functioning with associated circuits as a circuit means connecting said one output of said function generator FG, or an output of the function generator FG which is 180° out of phase with said one output, to the motor YM, in addition to the $L_\alpha$ and $L_\beta$ networks. The voltage appearing at the output of samplifier XSA under these conditions may be expressed as follows:

$$E_x = E_a + E_{A1} \cos \omega t \quad (44)$$

which it will be noted corresponds exactly to Equation 8 hereinabove. The voltage appearing at the output of amplifier YSA is as follows:

$$E_y = E_\beta + E_{B2} \cos \omega t \quad (45)$$

Note that in each instance the time varying voltages selected at the function generator are negative and that the outputs of the ladder attenuators $L_\alpha$, $L_\beta$ are also negative. These, when inverted in the respective amplifiers XSA and YSA have the relationships indicated in Equations 44 and 45. These equations depict a line having a starting point in the first quadrant of the coordinate system $X_F$, $Y_F$ and terminating at a corresponding point in the third quadrant of $X_F$, $Y_F$ as explained hereinabove. $E_a$ represents the coordinate distance in $X_R$ to the center of coordinate system $X_F$, $Y_F$ which is the center of the line which is to be drawn and $$E_{A1} \cos \omega t$$

represents coordinate distances in the coordinate system $X_F$, $Y_F$ of the actual figure or line which is to be drawn. Similar considerations apply to the expression $$E_\beta + E_{B2} \cos \omega t$$

Equations 44 and 45 depict a line of positive slope as defined herein.

The same line may be drawn by starting in the third quadrant of the coordinate system $X_F$, $Y_F$. The quantities A and B are both negative in this situation and the slope is positive, as defined herein. Hence the tape will be suitably marked to indicate negative values of the quantities A and B and the signals $ASn$, $BSn$ result in energization of both relays K47 and K48. The voltages $E_x$, $E_y$ may now be expressed as follows:

$$E_x = E_a - E_{A1} \cos \omega t \qquad (46)$$

and $$E_y = E_\beta - E_{B2} \cos \omega t \qquad (47)$$

It will be noted that Equations 46 and 47 correspond respectively to Equations 12 and 13 hereinabove.

The two conditions for negative slope, as defined herein, in which the line is started, respectively, in the second quadrant and in the fourth quadrant, as defined in pairs of Equations 14 and 15, 16 and 17 hereinabove, will be evident from previous explanations.

When it is desired to draw a circular arc, circular arc relay K21 is energized. Contacts K21a and K21b now switch the input circuits of attenuator sections LA2 and LB1 of respective ladder attenuators LA and LB from ground to the function generator to receive the time varying output voltages of the function generator. Contacts K21c switch the input of a line characteristic generator LCG from the voltage, $-E_R \sin \omega t$, to a fixed reference voltage. This is disclosed at a later point. If a circle is to be started in the first quadrant and has a starting point $P_2$ defined by positive coordinates A and B, sign relays K47 and K48 will be de-energized as shown. The output voltage $E_x$ at the output of summing amplifier XSA will be $$E_x = E_a + E_{A1} \cos \omega t - E_{B1} \sin \omega t \qquad (48)$$

The equation for $E_y$ will be $$E_y = E_\beta + E_{A2} \sin \omega t + E_{B2} \cos \omega t \qquad (49)$$

Note again in writing these equations that all of the signs have been changed from those indicated in the drawing to represent the output at the respective X and Y summing amplifiers. These equations it will be noted are the electrical counterparts of Equations 26 and 27 hereinabove. The equations for circular arcs which are started in the second, third and fourth quadrants of the coordinate system $X_F$ and $Y_F$ may be determined in the same manner, resulting, respectively, in pairs of Equations 28 and 29, 30 and 31, and 32 and 33, hereinabove, defining each of the conditions mentioned.

If a circular arc or circle is to be started on any one of the coordinate axes as described in connection with Equations 18 through 25 hereinabove, the relays will again provide the proper combination of voltages to control the servo. For instance, if a circle is to be started on positive $X_F$, the quantity A is positive and the quantity B is zero. The circular arc relay is again energized and the following equations may be written.

$$E_x = E_a + E_{A1} \cos \omega t \qquad (50)$$

$$E_y = E_\beta + E_{A2} \sin \omega t \qquad (51)$$

In Equations 50 and 51 it will be noted that only the voltage terms from attenuator sections LA1 and LA2 appear. Since the quantity B was zero, all of the relays of the attenuator sections LB1 and LB2 of ladder attenuator LB are de-energized. The outputs of these attenuators are now grounded and are effectively zero under these circumstances. Similar considerations apply to starting of a circle on either the positive or negative sections of the $Y_F$ axis and on the negative portion of the $X_F$ axis. The relay K21 and associated circuits may be regarded as a circuit means for interchanging or selectively connecting the time varying voltages to the motor YM.

When it is desired to draw an ellipse, this is designated by appropriately magnetizing the magnetic tape resulting in the production of signal EL and energization of the ellipse relay K22. This relay controls contacts K22a through K22d. Contact K22a switches the input to the attenuator section LB2 from the cosine voltage output terminals of the function generator to the sine voltage output terminals of the function generator, controlled by contacts K48a of the B sign relay, K48. Contacts K22b in series with contacts K21c switch the input of the line characteristic generator circuit LCG from the voltage $-E_r \sin \omega t$, of the function generator to the fixed reference voltage $E_R$ for a purpose to be described at a later point. Contacts K22c and K22d interchange the voltages $$+E_r \sin \omega t$$

and $$-E_r \sin \omega t$$

between the two poles of contacts K48a to provide the proper voltage polarities for drawing the ellipse. The ellipse is always started on either the positive $X_F$ or negative $X_F$ axis and, unlike the circle or circular arc which is always drawn in a counterclockwise direction, may be selectively drawn clockwise or counterclockwise from either of its starting points along positive or negative $X_F$. Assuming that the ellipse is started at $P_2$ on positive $X_F$ and that both A and B are positive, and recalling that the relay K22 is now energized, the following equations may be written, again with reference to the output of amplifiers XSA and YSA (see also Equations 34 and 35), $$E_x = E_a + E_{A1} \cos \omega t \qquad (52)$$

and $$E + E_\beta + E_{B2} \sin \omega t \qquad (53)$$

If A is greater than B the ellipse will appear as depicted in FIG. 23 and for the condition A+, B+ will be generated counterclockwise beginning at $P_2$ and terminating at $P_3$ which are coincident on $X_F$. If B had been greater than A the ellipse would appear as in FIG. 26 and would be generated in a counterclockwise direction with the starting point $P_2$ and stopping point $P_3$ coincident on $X_F$. If it had been desired to draw an elliptical arc in the same direction the quantity $E_z$ would have been utilized to stop the counterclockwise direction of the ellipse from $P_2$ on positive $X_F$ when the desired arc had been drawn. The ellipse may be generated in a clockwise direction from $P_2$ on positive $X_F$ by the simple expedient of designating the quantity A positive and the quantity B negative (Equations 36 and 37). This results in the generation of the following electrical quantities $$E_x = E_a + E_{A1} \cos \omega t \qquad (54)$$

$$E_y = E_\beta - E_{B2} \sin \omega t \qquad (55)$$

If the ellipse is started on negative $X_F$ and is to be drawn clockwise the quantity A is negative and the quantity B positive (Equations 38 and 39). If started at the same point and drawn counterclockwise both quantities A and B are negative (Equations 40 and 41). These expressions may be written directly from the circuits herein illustrated, assuming appropriate energization and de-energization of the respective A and B relays to achieve the results desired. It will be observed that like the circular arc relay K21, the ellipse relay K22 and associated circuits also interchanges or selectively connects the time varying voltages with one of the motors, in this case the Y motor YM.

The servos which drive the X and Y inputs of the X-Y plotter, generally designated XYP, are conventional in character. These are amplifier powered position servos in which an input voltage representing a desired position is compared with a feedback voltage representing an actual position. In the system herein described the drawing speeds, under all circumstances, are sufficiently low and the output voltages of the digital-to-analog converter as applied to the inputs of the X and Y servo are of sufficiently low frequencies, that the servo is able to follow the time varying input voltages with very small error. These servos regulate continuously for zero error between the input and feedback voltages and thus effectively trace a voltage to generate a line all points on which are represented jointly by the instantaneous X and Y coordinates of the respective input voltages. Each servo comprises an input summing amplifier. These are respectively designated XSA and YSA. The output of each amplifier is applied in opposition to respective feedback voltages tapped from potentiometers XP and YP across respective input resistors $X_R$ and $Y_R$ for chopper circuits XC and YC, respectively. The respective taps of the potentiometers are driven through suitable gearing arrangements in each case, by the X motor, XM and Y motor, YM, so that the voltages tapped from the respective potentiometers accurately represent the actual position of the member driven thereby. The potentiometers are energized by respective voltage sources identified XS and YS, respectively, here represented as batteries in the interest of convenience. The voltage across the potentiometer in each case represents the longest line which can be drawn in either the X or Y coordinate directions of the plotting board. If the outputs of the summing amplifiers swing between a relatively small negative voltage, say $-.2$ volt and a positive voltage of the order of $+28$ volts, the voltages across the feedback potentiometers will correspond approximately to this range of voltages, say of the order of 28 to 30 volts with respect to ground.

The servo motors XM and YM are two-phase servo motors provided with respective fixed field windings XF1 and YF1, which, as indicated, are energized with 400 cycle alternating current. The respective choppers XC and YC are controlled by 400 cycle alternating current and are therefore synchronously operated with the motor supply voltage. The output of each of the choppers is amplified in respective motor amplifiers XMA and YMA as indicated. These amplifiers power the control field windings XF2 and YF2, respectively, which produce the quadrature fields producing motor torque and rotation.

The chopper circuits are identical. One, the chopper circuit XC, is depicted in FIG. 37 where one terminal of the input resistor $X_R$ is applied to the heel of a vibrating contact which is magnetically actuated between each of two stationary contacts by means of a 400~ alternating current energized winding, W1. The other terminal of resistor $X_R$ is applied to a center tap of a primary winding P1 of a transformer, generally designated T1. A secondary winding S1 of transformer T1 is connected between ground and the input to amplifier XMA, for example. By this expedient the error voltage appearing across the input resistor $X_R$ is switched between the center tap and the opposite ends of primary winding P1, synchronously with the 400 cycle supply voltage to generate a 400 cycle alternating current voltage in the secondary winding S1 of the transformer, the phase of which reverses with reversals in polarity of the error voltage appearing across resistor $X_R$.

As indicated in FIG. 31c, the X–Y plotter is provided with 2 pens. These are designated PE1 and PE2 and are separated from one another in both X and Y coordinates, respectively denoted X parallax and Y parallax. If the pen PE1 denotes the thin pen, any programming or positioning of the system in which pen PE1 is involved is not satisfactory for positioning the pen PE2 since this is displaced in both X and Y coordinates from the position of the pen PE1.

To compensate this situation the summing amplifiers XSA and YSA are provided with biasing networks which are coupled to the common terminal, in each case, of switches S1 and S2. Switches S1 and S2 are double pole, double throw switches. In the positions shown the biasing networks are coupled to the input circuits of the respective summing amplifiers in parallel with the line generating voltage networks. Each biasing network includes a biasing potentiometer. These are respectively designated BX and BY. During adjustment of the system the switches S1 and S2 are switched to the other positions than those indicated herein disconnecting the outputs of the line generating networks from the inputs to the summing amplifiers. By this expedient only the input biases afforded by the respective biasing networks are applied to the summing amplifiers. With the circuits herein illustrated zeroing of either of the pens in the position in which $X_R$ and $Y_R$ are each zero requires a connection of the appropriate pen biasing circuit into the system. The pen biasing circuits include respective potentiometers P1X and P1Y applying input biases to compensate the particular pen PE1. Potentiometers P2X and P2Y provide input biases to the respective amplifiers to provide parallax voltage compensation for the pen PE2. The use of separate biasing networks for the two pens in addition to the zero bias is advantageous in that replacement of a pen, say PE1, which may result in a slight displacement of the pen from the original point does not necessitate readjustment of the bias of one of the potentiometers BX and BY since this would introduce an error with respect to the other pen PE2. In this situation the provision of the separate circuits permits compensation of the parallax error introduced with changing of either of the pens, in a particular one of the pen biasing potentiometer circuits.

As will be recalled, the selection of pens is controlled by the signals TN and TK, respectively, representing thin pen and thick pen. These signals are utilized to control energization of the coils of respective relays K52 and K53 to selectively close the contacts K52a or K53a to connect the selected pen biasing circuit to the negative voltage supply indicated. During zeroing of the servos relay K52 will be energized and adjustments will be made on potentiometer BX and P1X to zero the servo with respect to pen PE1 in the X coordinate $X_R$. Thereafter potentiometers P1Y and BY are adjusted to zero pen PE1 in the direction $Y_R$. When this adjustment is made relay K52 is deenergized and relay K53 is energized closing contacts K53a and switching potentiometers P2X the P2Y in the respective biasing circuits for the X and Y summing amplifiers. At this time potentiometer P2X is used to zero pen PE2 in $K_R$ and potentiometer P2Y is used to zero the pen PE2 in $Y_R$. Any drift which may occur in the circuit under these circumstances is now conveniently compensated by the single adjustment of potentiometers BX or BY as required to zero the pens. At any time a pen is changed the parallax correction for the pen will be made at the appropriate pen biasing potentiometers and the bias potentiometers BX and BY need not be disturbed. These adjustments remain during operation of the amplifiers under the control of the line generating voltages.

The coding of the tape may be changed so that only a thick pen is designated. In this circumstance all programming will indicate the thin pen and when a thick pen is desired only a single relay need be energized in order to switch in an appropriate amount of parallax bias. These and other expedients will be obvious to those skilled in the art in this situation.

The circuits have three modes of operation. The first is the slewing voltage mode of operation in which the pen on the XY plotter is slewed to a position.

$$E_X = E_a + E_{A1}$$

and $$E_Y = E_\beta + E_{B2}$$

In this mode of operation an output voltage is produced in each of the X and Y servo channels which represents an error in excess of the normal error voltage. These two error voltages are combined in a suitable diode network or rectifier bridge, generally designated D3, to produce an output voltage, as will be described at a later point, which is utilized to hold the pen on the XY plotter in elevated position. In view of the fact that a line is not being drawn, the particular path that the pen might take to get to this starting position of the line is of no concern. Hence, no effort is made to regulate the slewing speeds of the servos. The diode network D3 includes a storage capacitor C4 connected across its output terminals. This capacitor maintains the output voltage a sufficient period of time after the X error and Y error voltages XE and YE have had several excursions through zero in and about the position at which the line is to be started so that the pen is held up until such time as the pen mechanism has settled to substantially zero. At this point the pen may be dropped.

The second mode of operation may be termed the line generating mode and has been discussed in part hereinabove. In this mode the servos essentially trace the $E_X$ and $E_Y$ voltages in order to draw a particular figure.

The third mode of operation is that of "remembering" the position in which the pen was lifted so that another line to be continued from that point or an adjacent point may be programmed with respect to that point, with minimum slewing. This memory of line end point is achieved by de-energizing relay K8 which opens contacts K8$c$ and K8$d$. Under these circumstances the inputs from the ladder networks to the amplifiers XSA and YSA are disconnected and the amplifier outputs are maintained by the control afforded by the voltage on respective capacitors C5 and C6 connected between the inputs and outputs of the X and Y summing amplifiers. These capacitors maintain their charge, and, hence, their voltages, a period of time sufficient to permit reading of the new section of the tape and initiation of drawing of the new line with a minimum of slewing to the starting point of the next line.

The control of the pen for line termination is provided by the voltage $E_z$ which is indicated at the summing junction ZJ. This voltage represents the algebraic sum of the voltage outputs of the ladder attenuator networks LC and LD. These networks are controlled by individual voltages of the C and D quantities produced by the shift register, as seen in FIG. 31$a$, and sine and cosine time varying voltages of one polarity or the reverse are applied by contacts K49$a$ and K49$b$ of relays K49 and K50, in turn controlled by the sign signals CS$n$ and DS$n$ representing, respectively, the signs of the quantities C and D, to the LC and LD networks. The significance of the C and D quantities has been explained hereinabove. The line terminating equation is identified as Equation 5. FIG. 13 depicts a special form of the line terminating quantity for a straight line. FIGS. 17 and 18 depict the line terminating quantity for a more general situation and FIG. 22 shows the line terminating quantity for the case of a full circle or a full ellipse, as the case may be. As discussed, line termination is desired at the time that the quantity $Z(t)$ goes through zero, passing from negative to positive at the input to amplifier ZA. The quantity $Z(t)$ characterizes the voltage $E_z$ for any of the cases named.

Line start and termination is provided by a pen control circuit PCC which includes a pair of bistable amplifiers. The first of these, which receives the voltage $E_z$, at its input, is identified ZA. The second of these, which receives the output of the first, is designated ZA2. For the purposes of this discussion these amplifiers may be assumed to be identical. Each is a high gain amplifier having its input and output circuits connected to the terminals of a diode network or bridge including a pair of zener diodes D7 and D8 in adjacent legs. Diode D7 is connected between the output of the amplifier Z$a$ and a resistor which is connected to a positive voltage supply. Diode D8 is similarly connected between the output of the amplifier Z$a$ and a resistor connected to a negative volt supply. As indicated, the diodes are backbiased and serve to clamp the output of the amplifier at output voltage levels of approximately $+28$ v. or $-28$ v. as determined by the input voltage. The amplifiers are switched by small excursions of input voltage on either side of zero volts. The output of amplifier ZA is differentiated in a differentiating circuit including a capacitor C7 and a resistor R12 which is connected between the output terminal of the capacitor and ground. The output terminal of capacitor C7 is connected through a resistor R13 and the normally open contacts K11$c$ of a relay K11 to the input of amplifier ZA2. The output of amplifier ZA2 is resistor coupled into the base of a transistor Q1, the emitter of which is connected to a pen control mechanism generally designated PM, the details of which appear in FIG. 38.

The pen control mechanism comprises a movable pen lever 10 pivotally mounted in a bracket 11 on a plate 12 extending from a support 13 which is powered by both motors. A second lever 14 pivotally mounted in a bracket 15 on the support 12 has its end flexibly connected to the end of lever 10 by means of a flexible connection 16. A magnet 17 when energized attracts and rotates lever 14 clockwise about its pivot in bracket 15 rotating lever 10 counterclockwise, dropping the pen. The pen is spring loaded to retracted position by a suitable spring 18 which rotates lever 14 counterclockwise. The magnetic bias of electromagnet 17 at the time the pen is to be dropped, overcomes the spring bias and moves the pen into a position engaging the drawing board. Additional refinements in the form of pen dampfacilities and mechanical limits, are of course, provided in an arrangement of this sort to provide pen engagement without damage to the pen or spilling of ink. These details are not illustrated in the interests of simplicity since they form no part of this invention.

A second transistor Q2 is also connected to the output of the amplifier ZA2. The emitter circuit of this second transistor is utilized to control several control relays yet to be described.

The collectors of both transistors Q1 and Q2, as shown, are connected to a $-28$ volt source and the emitters are connected through suitable loads such as the solenoid which actuates the pen, or through relay coils to ground. With the voltage polarities shown, the application of a positive voltage to the base of either of the transistors cuts these transistors off and the application of a negative voltage of suitable magnitude results in conduction of these transistors. To avoid driving the transistors excessively into saturation a zener diode D9 may be connected between the base circuits and ground, as indicated, to provide a negative voltage clamp preventing excursions beyond a desired negative value.

The input to amplifier ZA2 is additionally controlled, when relay K8 is de-energized, by a $-28$ volt supply which is applied by contacts K8$b$ through resistors R14 and R15 to the input of the amplifier. In view of the fact that the pen is spring loaded to retracted position the pen up signal is represented in de-energization of the transistors Q1 and Q2, de-energization of transistor Q1 maintaining the coil of the pen solenoid de-energized. This requires a positive voltage on the base of the transistors which means that the amplifier ZA2 must have an electrical output which is high. The $-28$ volt bias at the input cuts this amplifier off with the net result that it is switched to the higher of the two voltage states, that is, approximately 28 volts, which in this situation applies a cutoff bias to the base of both of the transistors Q1 and Q2.

Amplifier ZA2 also has a small positive bias applied to its input circuit by means of a bias circuit including resistors R16, R17 and grounded resistor R18. This bias circuit is connected between $+300$ volts and the input circuit for amplifier ZA2. In the absence of other bias voltages this bias circuit triggers the amplifier ZA2 to its negative output voltage state.

A holdoff bias which is the negative voltage output of diode bridge D3 is applied to amplifier ZA2 during the slewing mode of operation. During slewing, relay K10 is de-energized and contacts K10a connect the rectified negative error voltage through a circuit including a polarizing diode D10 and calibrating resistor R19 to the input circuit of amplifier ZA2. This holdoff voltage swings from a negative value, determined by the maximum servo error voltage XE or YE, toward ground or zero volts. The RC time constant of this circuit is such as to permit several excursions of the error voltage through zero prior to the time that amplifier ZA2 is switched by the predominating positive bias of bias network R16, R17, R18 as zero holdoff bias is approached. This delayed holdoff voltage allows the servo and the pen to settle in line start position prior to switching of the amplifier ZA2 to its negative output voltage state to initiate the production of the pen down signal at transistor Q1.

The operation of this pen control circuit PCC is briefly described at this point without reference to specific controls of certain of the relays K8, K9, K10, K11 and K111 which are involved. In this operation it is assumed that power supplies have been turned on but that the system has not been started.

Under the circumstances above, relays K8 and K11 are de-energized. Contacts K8b are closed and connect −28 volts through resistors R14 and R15 to the input circuits of amplifier ZA2. This amplifier is therefore switched to the higher of its two output voltage states producing a positive bias at the base of transistors Q1 and Q2 so that these transistors are cut off. Since relay K11 is de-energized contacts K11c are open and the output of amplifier ZA is not coupled to the input of amplifier ZA2. When the system is started relay K8 is energized closing contacts K8c and K8d connecting the ladder attenuator circuits with the input circuits of the summing amplifier XSA and YSA. Assuming that the ladder attenuators have been set, the voltages which are summed by the respective amplifiers for a straight line, for instance, include the voltages $E_\alpha$ and $E_{A1}$ for the X coordinate of the starting point of the line and the voltage $E_\beta + E_{B2}$ for the Y coordinate of the line. Relay K111 is also de-energized at this time and contacts K111a are open. Relay K7 in the function generator controlled by contacts K111a is de-energized and the function generator is caged. The application of these fixed voltages to the inputs of the respective summing amplifiers results in large error voltages across resistors XR and YR constituting the chopper circuit input. The servo motors run at high speed, slewing the pen into pen start position under the influence of the algebraic sum of the input voltages at the summing amplifier.

Relay K10 is also deenergized and contacts K10a couple the output of the diode bridge D3 through diode D10 and the resistor R19 to the input of amplifier A2. This negative voltage replaces the negative voltage previously applied by contacts K8b which are now open and is instrumental in holding amplifier ZA2 in its high voltage output state, preventing the generation of a pen down signal. When the pen is properly positioned and the holdoff voltage has decayed sufficiently the net positive bias resulting from the bias network R16, R17, R18 switches the amplifier ZA2 to the other of its two stable states negatively biasing the bases of transistors Q1 and Q2 and causing conduction. This generates the pen down signal and the pen engages the paper. This pen down signal energizes relay K11 contacts K11c connect the output circuits of amplifier ZA to the input circuits of the amplifier ZA2, networks K11d energize relay K7 and the function generator operates.

If a straight line is to be drawn, the voltage $E_z$, the output of summing junction ZJ, is a negative sine wave voltage. Depending upon the state of the amplifier ZA at the instant the voltage $E_z$ is applied there the negative going excursion may switch the amplifier positive. The differentiating circuit C7, R12 produces a positive voltage pulse at the time the amplifier ZA is switched. Since amplifier ZA2 is already conducting and its output low this positive voltage pulse at its input has no effect. The time varying voltages which are applied to the X and Y summing amplifiers result in operation of the servos in the drawing mode, so that the pen describes a line defined by the time varying input voltages.

At the time the voltage $E_z$ goes through zero from negative to positive the amplifier ZA is switched so that its output goes negative. The negative pulse is coupled to the input of amplifier ZA2 by the differentiating network as amplifier ZA switches and cuts off the transistors Q1 and Q2, lifting the pen.

As noted earlier, provision is made for drawing broken lines. These are respectively identified in FIG. 31b as dash, center and section lines adjacent respective commutators CM1, CM2 and CM3. The dash line may be a sequence of equally spaced, equal length dashes represented by correspondingly shaped conducting and nonconducting segments on the surface of the commutator CM1. The center line may be sequences of dashes and dots. This is defined by correspondingly shaped conducting and insulating sections on the commutator CM2. The section line may be sequences of a dash and two dots correspondingly defined by suitably shaped conducting and nonconducting sections on the commutator CM3. Other configurations of drums may be used to achieve any assortment of dots and dashes as desired.

Each of the commutators is provided with a contact. These contacts are coupled by respective normally open relay contacts K17a, K18a, K19a to the base of the pen control transistor Q1. A slip ring and brush assembly, SR1, SR2 and SR3, respectively, on each of the commutators is connected to ground, hence, at any time a drum contact engages a conducting segment the base of transistor Q1 is connected directly to ground and the transistor is cut off interrupting the pen down signal provided by amplifiers ZA2. By this expedient the pen may be raised and lowered at a speed dependent upon the size and spacing of the commutator segments and the angular rate of the commutators. These conditions together with the rate of movement of the pen, control the size of the dashes and/or dots and their spacing as they are produced on the drawing.

The line characteristic generator LCG includes a two phase motor M having a fixed field winding F1 energized, for instance, by 60 cycle alternating current, and, having a pair of control field windings, F2a and F2b, which may be formed by tapping a single winding which are energized by the outputs of respective transistors Q3 and Q4 connected in electrical opposition. The motor M is mechanically connected to and drives a tachometer generator TG having a fixed field winding TF1 also energized by 60 cycle current and having an output field winding TF2. The bases of transistors Q3 and Q4 are connected to the respective ends of a secondary winding S2 of a transformer generally designated T2. The primary winding of transformer T2 is controlled by a transistor Q5 which has a grounded emitter and the collector of which is connected to −28 volts through a zener diode D11 in series with primary winding P2 of the transformer T2. A gain control potentiometer, GP, is connected between the base of the transistor Q5 and ground and is coupled by means of a series capacitor C9 to the output of a resistance input resistor-capacitor filter RCF, which, in turn is energized by the output of a 60 cycle chopper CGC. A pair of trim potentiometers TP1 and TP2 are employed to control starting and spacing of the line characteristic. Input voltage is applied to the line characteristic generator at terminal T6 by means of contacts K16b. The input voltage may be a fixed negative reference voltage or may be a negative time varying voltage depending upon the contacts K21c and/or K22b on the circular arc and ellipse relays K21 and K22, respectively.

The tachometer generator TG is of the alternating current type and being energized with 60 cycle voltage it produces a 60 cycle output voltage the amplitude of which is proportional to the speed. The transistors Q3 and Q4 are connected in common emitter configuration and grounded together with the center tap of the secondary winding S2. The collectors of the respective transistors are connected to −28 volts through the respective motor control windings F2a and F2b. The output of winding TF2 of the tachometer generator is connected in electrical opposition to the input voltage between ground and one terminal of coupling capacitor C9, the other terminal of which is connected to the tap of the gain potentiometer GP. By this expedient the tachometer generator output voltage is combined with the input voltage in such sense as to regulate the differential excitation of the field windings F2a and F2b of the two phase motor. The small net error voltage and resulting excitation, which is always in one direction, controls the speed of operation of the commutators CM1, CM2 and CM3 and, hence, controls the drawing of broken lines. The use of the sine wave voltage on the input of the line characteristic generator during the drawing of straight lines controls commutator speed in a sense to match pen speed. On a circle or ellipse the pen speed is relatively constant and a fixed reference voltage $E_R$ is used (contacts K21c when circular arc relay K21 is energized).

The selection of a particular commutator is under the control of relays K17, K18 and K19 which are controlled by the line characteristic output LCH of the shift register. As will be noted from the tape format hereinabove three spaces are provided on the tape for designating the type of broken line to be drawn. The single circuit connected to relays K17, K18 and K19 therefore represents a cable having three conductors. At such time as one of the three signals exists, the appropriate relay is energized to connect one of the three commutators in the pen control circuit.

When the line characteristic generator is employed it is always desirable to operate the pen at slow speed. This is accomplished by coupling the three signals through respective diodes D12, D13 and D14 to the coil of a relay K16, the other end of which is connected to −28 volts. The presence of a signal completes the relay circuit which closes contact K16b and selectively switches the negative reference voltage, $-E_R$, or a negative time varying voltage, $-E_R \sin \omega t$, to the input terminal T6 of the line characteristic generator depending upon whether or not relay K21 is energized. At the same time, contact K16a is closed which applies a line characteristic signal LCH to the coil of relay K6. As will be recalled, the contacts of relay K6 reset the frequency attenuators of the function generators simultaneously to provide about a 3 to 1 reduction in the frequency of the time varying output voltages.

As will be seen in FIG. 31c, a digital control logic circuit DL is provided which produces certain control signals. This circuit is provided with a manually controlled start switch SW utilized to start the system and produces an output signal TD which is applied to the tape deck and used to control the tape reader. Suitable control signals generated by the shift register and certain control flip flops asssociated therewith and with the digital controls, are applied to the digital control circuit. The digital control circuit DL also receives drawing address and line address signals DA and LA from the shift register. These signals are initiated by the tape as indicated on the tape format. The digital control at such time as tape reading is completed and the system is prepared to draw a line as defined by the digital instructions, produces a start signal S which is applied to a relay K14, the contacts K14a of which when closed apply −28 volts to the circuit.

Although any suitable type of digital control may be employed for this purpose, one type embodying certain suitable logical interrelationships of several control components is illustrated in FIG. 39. The circuit arrangement which is shown here depicts both automatic and manual modes of operation. It will be appreciated by those skilled in the art that suitable provisions may be made to provide a more elaborate control of the system.

As earlier noted herein, a single tape may include encoded information for several drawings. Under such circumstances the drawing address section DA will be specified in each block of line instructions, as illustrated in the tape format. Similarly, each block of line instructions will include a line address section LA to identify the particular line. Thus, if a particular line of a particular drawing is being searched for, the existence of correspondingly identified lines in drawings other than the one specified will not result in stopping of the tape, but, only with the occurrence of a proper drawing address and subsequently the proper line address, will the tape be stopped.

For this purpose the digital control circuit DL includes both drawing selection DS and line selection LS facilities. These may include, respectively, simple groups of toggle switches corresponding in number to the number of bits involved in the binary identification of a particular drawing and line. These switches are set to agree with the code identifying the desired items. The blocks DI and LI representing drawing identification and line identification involve flip flops of the shift register SR which are set by the drawing address and line address signals on the tape. The outputs of the drawings selection and the drawing identification circuits are applied to an "and" gate AG1. When coincidence exists among the corresponding individual signals from these separate sources the "and" gate is enabled and will gate a clock pulse. Similarly, at such time as line selection and line identification signals are identical, inputs are applied to "and" gate AG2 to enable this "and" gate. "And" gate AG2 is additionally controlled by the output of "and" gate AG1. At such time as these three signals exist "and" gate AG2 will gate a clock pulse.

The system may be operated in drawing selection and line selection modes. The line selection mode may not be used without also having a suitable drawing selection quantity or signal, otherwise a line having the identifying code may be selected from any drawing. The application of these circuits in controlling the system is therefore under the control of line select and drawing select switches LSS and DSS, respectively. These switches are used to complete energizing circuits for the coils of respective line and drawing select relays LK3 and DK6, the coils of which in each case are connected between −28 volts and ground by operation of the respective switches. A circuit including a polarizing diode D16 connects the switch LSS to the coil of relay DK6. At such time as switch LSS is closed (the line selection mode) the diode circuit completes an energizing circuit for the coil of relay DK6. Thus, both relays LK3 and DK6 are energized. When relay LK3 is energized contact LK3a which shunts the line select circuit LS is open and the flip flop FQ2 which is controlled by the output of "and" gate AG2 may be operated only upon coincidence in both the drawing select and line select circuits DS and LS. In the drawing select mode the line select circuits LS are not needed. Hence, the relay LK3 is deenergized and contacts LK3a are closed. The output of "and" gate AG1 is now coupled directly into the flip flop FQ2.

Flip flop FQ2 is the line coincidence and/or drawing coincidence indicator. In its "1" representing electrical state, Q2, this flip flop indicates that coincidence exists. In its "0" representing electrical state, $\overline{Q}2$, the flip flop indicates that drawing coincidence does not exist. This flip flop when the system is normally set in its $\overline{Q}2$ electrical state to indicate that drawing coincidence does not exist. It is also set to its $\overline{Q}2$ electrical state between each line instruction block.

Control flip flops FQ6, FQ1 and FQ7 which are cascaded in the sequence described are utilized in the production of delayed clock pulses which are used in controlling the flip flops of the shift register and in the production of an end of block signal. As described hereinabove, at the time the system is to be started flip flops 1F2 through 1F24 are switched to their zero representing electrical states, whence, the output of all of these flip flops is the "0" or the $\overline{Q}$ electrical output, that for flip flop 1F24 being designated $1\overline{Q}24$ and shown as input to the flip flop FQ6. The other input terminal of flip flop FQ6 is designated 1Q24 which is the representation of the electrical state of flip flop 1F24 in its "1" representing electrical state. Flip flop 1F1 the first flip flop in this particular flip flop channel of the shift register is set to its "1" representing electrical state, 1Q1.

At the time the system is started the signal $1\overline{Q}24$ exists. This signal remains through 22 clock pulses and on the 23rd clock pulse the "1" which was originally stored in flip flop 1F1 is transferred to the flip flop 1F24. Hence, on the 23rd clock pulse the output of the flip flop 1F24 is represented by 1Q24. With the 24th clock pulse of the bit shift cycle the control flip flop FQ6 contains the "1" that was initially contained in flip flop 1F1. The "1" representing electrical state of flip flop FQ6 and the next clock pulse turn off the flip flop FQ1 so that it switches to its $\overline{Q}1$ electrical state.

As illustrated, a pulse converter and delay circuit PC receives the output from the tape reader TR producing the delayed unidirectional clock pulses CP previously described. These clock pulses are used to produce the delayed clock pulses DCP which are applied as inputs to an "and" gate AG8 having an electrical output designated GCP representing gated clock pulses. "And" gate AG8 is enabled by the presence of the signal Q1 on one of its input terminals. Hence, as long as flip flop FQ1 is in its "1" representing electrical state, in which the signal Q1 exists, the clock pulses DCP are produced. This is the normal state of the flip flop FQ1 during reading of the tape and shifting of the information into the tape reader. The gated clock pulse GCP is the signal applied to the respective "and" gates of the shift register SR and is the clock pulse signal which steps these flip flops in time displaced synchronism with reading of the information from the tape. The clock pulse column of the tape includes several clock pulses beyond the 24 clock pulse limit. Hence, additional clock pulses are provided beyond the end of a block to properly control the flip flop FQ1 and in turn the flip flop FQ7 to produce the necessary output signals to stop the tape at the end of the message for a particular line.

Flip flop FQ7 is normally in its zero representing electrical state $\overline{Q}7$. At the end of tape reading (the 26th clock pulse) this flip flop is switched to its "1" representing electrical state, Q7. This signal is selectively utilized with other signals to affect certain controls, as will be described.

Since the output, Q2, of flip flop FQ2 represents drawing or drawing and line coincidence, and since the output, Q7, of the flip flop FQ7 denotes that a block of information has been read, the simultaneous occurrence of these two signals is indicative that the tape should be stopped. These two signals are combined in the input circuits of an "and" gate AG4 producing an output signal when input signal coincidence exists. This signal is applied by an "or" gate OG1 to one of two input terminals of a tape deck flip flop FQ$td$ which sets this flip flop in its zero representing electrical state $\overline{Q}td$. This signal controls a relay driver to inhibit signal TD and stop the tape. When this signal is removed the output signal TD of the relay driver starts the tape.

When the system is not in its drawing selection or line selection modes of operation relay DK6 is deenergized. Under these circumstances the contacts DK6$b$ are closed. Since drawing coincidences is not a part of the control under these circumstances, the signal Q7 is utilized by itself when the contacts DK6$b$ are closed to generate the signal $\overline{Q}td$. This is accomplished by applying the electrical signal Q7 through the contacts DK6$b$ to the input of an "or" gate OG1. This signal is therefore separately gated to generate the stop signal at the output of the gate and set the flip flop FQ$td$ to its $\overline{Q}td$ electrical state to stop the tape. When the system is started the flip flop FQ7 is in its $\overline{Q}7$ electrical state. Assuming that this system is not in its drawing selection or line selection mode, closure of the start switch SW results in the application of a signal to one termianl of an "and" gate AG6. The other input terminal of "and" gate AG6 has the signal $\overline{Q}td$ applied thereto by the output of an emitter follower circuit EF1 of conventional type controlled by the output $\overline{Q}td$ of the flip flop FQ$td$. This flip flop is set in this electrical state after the tape is stopped and remains in this electrical state. The output of the "and" gate AG6 is applied as input to an "or" gate OG2, the output of which triggers a one shot multivibrator MV1. The output of this multivibrator is applied to the one setting input terminal of tape deck flip flop FQ$td$ which switches this flip flop to its one representing electrical state Q$td$. With switching of signal $\overline{Q}td$, the forward signal TD to the tape deck is produced and the tape deck begins to operate. The output of the one shot multivibrator MV1 is also applied to a reset generator RG1. The output of this reset generator is applied to the reset terminal of the control flip flops FQ6, FQ1 and FQ7 and is also applied to the one setting input terminal of the flip flop 1F1 and to the zero setting or reset terminals of the flip flops 1F2 through 1F24. At this time the shift register flip flops and the control flip flops are in their proper electrical states for tape reading.

Flip flop FQ1, in its 1 representing electrical state in combination with the clock pulses CP produced by the pulse conversion circuit PC now produces a voltage state signal which is connected to one input terminal of an "and" gate AG8, the other input terminal of which receives the delayed clock pulse DCP. The output of "and" gate AG8 is the gated clock pulse GCP which is coupled to the "and" gates connecting the flip flops in the shift register (see FIG. 33). The information which is being read from the tape is synchronously stepped into the shift register. When flip flop FQ7 goes high, as earlier described, the signal $\overline{Q}td$ is produced and the tape is stopped. In this mode of operation a manual mode switch MMS is opened to inhibit the generation or "reset" and "start" signals whenever the line or "figure complete" relay K20 operates.

In the drawing selection mode of operation relay DK6 is energized, contacts DK6$a$ are closed and contacts DK6$b$ are opened. Initially there is an absence of coincidence between electrical outputs of the drawing selection and drawing identification circuits. Flip flop FQ2 is off and the signal $\overline{Q}2$ exists. This signal, along with the signal Q7 from flip flop FQ7 and the gated clock pulse GCP, is applied as input to an "and" gate AG3. If at the end of a complete block of information drawing coincidence does not exist, the signal $\overline{Q}2$ yet remains. Signal Q7, which is high at the end of the particular block which has just been read, is now utilized with signal $\overline{Q}2$ and the gated clock pulse GCP to provide another start signal to reset the shift register and the control flip flops so that another block of tape may be read. At such time as drawing coincidence exists the flip flop FQ2 switches to its Q2 electrical state. At the end of that particular block of information when the flip flop FQ7 goes high, "and" gate AG4 produces an electrical output which is gated by "or" gate OG1 to reset flip flop FQ*td*, inhibiting signal TD to stop the tape deck.

From time to time drawings must be changed. One great advantage in systems of this type is the fact that the making of drawing changes is facilitated. Inasmuch as each line of the drawing is coded, it is possible to identify a line on a particular drawing at which a change is to be made. The system therefore includes an arrangement which will stop the tape deck and, hence, stop system operation at such time as a particular line which is to be changed occurs. This is accomplished in the following way. A circuit is provided between the output of "and" gate AG2 which is in the line coincidence "and" gate and the input to "and" gate AG5 which supplies the analog start signal to the relay K14 to start the analog system. This circuit includes a modification selection MSA, which may be a unity gain inverter, which inverts the output of the gate AG2. A modification selection switch MS1 switches a terminal of "and" gate AG5 between ground and the output of the inverter modification selection amplifier MSA. When the modification selection circuit is not in use, switch MS1 is positioned, as shown, to ground the terminal of "and" gate AG5 which applies a gating potential to this terminal. When the modification selection is desired switch MS1 is moved to connect the output of the inverter modification selection amplifier MSA to the input of the "and" gate. In this mode of operation a drawing selection has been made so throughout the drawing period and prior to the time that the particularly selected line appears on the tape, the system will cycle through the blocks of tape reading and reproducing one line after another. The line selection circuit LS is set to indicate the particular line. If the selected line is line 58 of the drawing the line selection switches are correspondingly set. Up to the time the code for line 58 exists at the line identity circuit LI the output of "and" gate AG2 is low. This voltage is inverted to gating potential and applied to "and" gate AG5. Hence, with the occurrence of the other signals on "and" gate AG5 this gate is enabled and the analog system is enabled and line reproduction continues as previously described. At the time that line coincidence occurs the output of "and" gate AG2 goes high. This is inverted in the inverter amplifier and as a consequence the "and" gate AG5 is inoperative to generate a further analog start signal S. As a consequence the system stops at this point in the operating cycle. At this point the tape which has been used may be removed and changed or another tape which has been modified substituted therefor so that the drawing may continue with whatever changes are desired. It will be appreciated that expediences such as this facilitate drawing changes in that the time for effecting such changes is materially reduced.

At such time as a message has been completely read from the tape and stored in the shift register the system is ready to reproduce the stored information on the drawing. For this reason the signals Q2 and Q7 are used jointly to enable the analog portion of this system. After a particular drawing selection has been made and the tape reader has been stopped the switch DSS is open which deenergizes relay DK6. At this time contacts DK6*b* close connecting the signal Q7 as input to one terminal of the "and" gate AG5. The signal Q2 indicating drawing selection coincidence exists on the other terminal of the "and" gate AG5. Gate AG5 now operates a relay driver circuit RD1 which produces a start signal S used to energize an analog uncaging relay K14. Contacts K14*a* connect —28 volts to the analog circuit.

At this time the relays of the ladder attenuator networks have been set by the shift register SR which now stores the information which has been read from the magnetic tape. Fixed negative input voltages are applied to the ladder attenuators of the ladder networks $L_a$ and $L_\beta$. As will be seen by reference to FIG. 35, when relay K7 is deenergized contacts K7*a* and K7*b* thereof connect the inputs of integrator amplifiers IA1 and IA2 to —48 volts and ground, respectively. Terminals T1 and T2 are at —48 volts and +48 volts, respectively and terminals T3 and T4 are at ground or zero volts. Assuming that a straight line is to be drawn and that the quantities A and B defining the start point of the line in the XF, YF coordinate system are positive, relays K21, K22, K47 and K48 are deenergized. Since a straight line is to be drawn, C equals 1 and D equals zero, whence, both sign relays K49 and K50 are deenergized. Contacts K47*a*, when relay K47 is deenergized, connect the terminal T1 (—48 volts) of the function generator to the input of the ladder attenuator section LA1. Contacts K48*b*, when relay K48 is deenergized, connect —48 volts to ladder attenuator LB2.

Assume for the moment that the tape has not been read. In this circumstance, the relays K14 and K8 are deenergized. The normally closed contacts K8*b* of relay K8 apply a negative bias to the input of amplifier ZA2 in the pen control circuit PCC. The output of amplifier ZA2 is therefore positive and biases transistors Q1 and Q2 to cut off. Contacts K8*c* and K8*d* in the input circuits of the summing amplifiers XSA and YSA are open preventing control of these amplifiers by the ladder attenuators. When relay K8 is deenergized the contacts K8*a* in series with the normally closed contacts K11*b* and K9*b* complete an energizing circuit for the coil of relay K12. This relay now picks up closing its contacts K12*a*. When contacts K12*a* close relay K20 is momentarily energized. A capacitor C20 in series with the coil of relay K20 effectively opens the coil circuit after the initial voltage excursion which occurs when contacts K12*a* close. Relay K20 therefore picks up and then drops out, its contacts K20*a*, resetting the digital control circuit. The coil of relay K13 is shunted by a capacitor C21. This relay is therefore delayed in pick up until the capacitor voltage reaches a level to which the relay will respond. When this happens contacts K13*a* close.

Continuing now with the sequence of operation after a block of tape has been read, relay K14, energized by the start signal S, closes ite contacts K14*a*. Since contacts K13*a* are now closed this completes the energizing circuit from —28 volts to ground through normally closed contacts of relay K11*a* and the coil of relay K8. Relay K8 is now energized. Contacts K8*a* now complete a holding circuit for the coil of relay K8 through the contacts K11*a*. During this interval, therefore, the coil of relay K8 remains energized through this second path. Contacts K8*b* open and remove the negative bias from the input circuit of amplifier ZA2 and contacts K8*c* and K8*d* close connecting the ladder attenuator networks to the inputs of the X and Y summing amplifiers XSA and YSA. The slewing voltages are therefore applied to the servo. The X error and Y error voltages appear at the outputs of the X and Y motor amplifiers XMA and YMA producing the hold off bias at the input of amplifier ZA2 substantially at the instant that the negative bias through contacts K8*b* is removed. The pen down signal is therefore inhibited and the pen is slewed into the starting position of the line as previously described.

When the servo has settled in this position and the negative bias has decayed toward ground potential the net positive bias resulting from the bias network R16, R17 and R18 triggers the amplifier ZA2, the output of which now goes to its negative bistable condition. Transistors Q1 and Q2 are now biased to conduction generating a pen down signal which is applied to the pen control mechanism PM, engaging the pen with the drawing surface. The output of transistor Q2 is applied to relays K9, K10, K11 and K111. The normally closed contacts K9*b* in the coil circuit of relay K12 now open and the relay K12 drops out, opening contacts K12*a* which, in turn, open the energizing circuit for the coil of the relay K13. The energy stored in the capacitor C21 momentarily delays drop out of the relay K13. Contacts K13*a* now open. Contacts K9*a* of relay K9 close. These contacts parallel the contacts K11a, which are still closed, in the holding circuit for the coil of relay K8. When relay K10 picks up the contacts K10a switch the output of the diode bridge D3 from the input circuits of amplifier ZA2 to ground. This removes the servo error bias voltage from the input to amplifier ZA2 and at the same time provides a circuit for discharging the capacitor C4 through a discharge resistor. Relay K111, also controlled by the transistor Q2, picks up with relays K9 and K10 and closes its contacts K111a. This connects the coil of relay K7 to −28 v. When relay K7 picks up, its contacts K7a and K7b uncage the function generator which now produces its time varying output voltages. These output voltages (the sine and cosine voltages) are identified in FIG. 31a in the function generator FG. Relay K11 is delayed in pick up by a capacitor C8 which shunts the relay coil. When the capacitor voltage reaches a level to which the relay K11 responds, relay K11 picks up. Its contacts K11a in the holding circuit for relay K8 are now opened. This circuit it will be recalled is now completed through contacts K9a. Contacts K11b in series with contacts K9b in the energizing circuit for relay K12 also open and contacts K11c close connecting the output circuits of the amplifier ZA and the differentiator circuit to the input of the amplifier ZA2. Since a straight line is being drawn in this example, and since the quantities A and B are positive for the assumed conditions, the relays in the switching network between the function generator and the ladder attenuator networks are deenergized. Contacts K21b and K21a which are now closed ground the ladder attenuators LA2 and LB1 so that these networks produce no electrical output. Contacts K47a, when relay K47 is deenergized, connect a voltage $-E_R \cos \omega t$ to the input circuits of the ladder attenuator section LA1 and contacts K48b, when relay K48 is deenergized, connect the electrical quantity $-E_R \cos \omega t$ to the input circuits of the ladder attenuator LB2. The output at the X summing amplifier XSA is therefore expressible as $$E_a + E_{A1} \cos \omega t$$

and the output at the Y summing amplifier YSA is expressible as $$E_\beta + E_{B2} \cos \omega t$$

As previously described the X and Y servos follow these time varying input voltages from the start point of the line and move the pen to draw the line until a line terminating signal is generated.

For the assumed conditions the quantity C is represented by +1 and the quantity D zero. Relay K49 is therefore deenergized and contacts K49a switch the voltage, $-E_R \sin \omega t$, to the input circuits of the ladder attenuator section LC1. The output of this network at the summing junction ZJ is therefore a negative sine wave voltage.

At this point reference must be made to the input bias provided on the amplifier ZA by the anticipate circuit. This has been previously described and is produced in the attenuator network RA3 in FIG. 35 which is set by the function generator frequency setting relays K1 through K5. This anticipate bias voltage produced by this network prior to connection of the output circuits of amplifier ZA to the input circuits of amplifier ZA2 has switched the output circuit of the amplifier ZA to its positive bistable voltage state. Hence, under these circumstances the input of the negative sine wave voltage $E_z$ effects no change in the output of the amplifier ZA. Consequently, there is no coupling of a signal into the input circuits of amplifier ZA2. As the line terminating voltage sweeps through zero from negative to positive the amplifier is suddenly switched from its positive output voltage state to its negative output voltage state. A negative going voltage pulse is produced by the differentiating circuit in the input circuits of the amplifier ZA2. The amplifer ZA2 now switches to its positive bistable output voltage state and cuts off the transistors Q1 and Q2.

Cut off of transistor Q1 terminates the pen down signal and the pen is lifted. Cut off of transistor Q2 deenergizes relays K9, K10, K111 and K11. Relays K9, K111 and K10 drop out immediately. When relay K111 drops out contacts K111a open, deenergizing relay K7. The function generator is caged as a result of opening of contacts K7a and K7b. Terminals T1 and T2 producing the negative and positive cosine voltages during oscillation, are now caged at −48 and +48 volts, respectively. Relay K11 drops out after a slight delay determined by capacitor C8. When relay K9 drops out the contacts K9b close and the contacts K9a open. Opening of the contacts K9a opens the coil holding circuit for the coil of relay K8. This opens the input circuits to the amplifiers XSA and YSA. The voltages stored on capacitors C5 and C6, respectively, indicate the coordinates of the point of line termination. This is called the "memory" mode of operation of the summing amplifier. When relay K11 drops out after the delay provided by capacitor C8 amplifier ZA2 is switched from control by amplifier ZA. The contacts K8b, now closed, maintain a negative bias on the input circuits thereof. Contacts K11a and K11b are now closed. When contacts K11b close the circuit for the coil of relay K12 is again completed closing contacts K12a. Relay K20 is momentarily energized and contacts K20a, as will be seen in FIG. 39, couple the input circuits of an emitter follower EF2, of conventional design, to ground resulting in the production of an output signal which is gated by "or" gate OG2 to the input circuits of the multivibrator MB1. This results in the production of reset signals which reset the control flip flops FQ6, FQ1 and FQ7 and which resets all of the flip flops of the shift register SR with the exception of flip flop 1F1 which is now set to its one representing electrical state 1Q1 by this reset signal. The output of multivibrator MV1 is also applied to the input terminal of flip flop FQtd which switches this flip flop to its "1" representing or Qtd electrical state. The relay driver now produces the output signal TD which is applied to the tape deck to again start the tape reader, as seen in FIG. 39, which, through the pulse conversion circuits now introduces inputs to the shift register SR which as before is synchronously stepped with delayed clock pulses DCP as previously described.

In drawing a straight line as described, the quantity C was set equal to 1 and D equal to 0. If a semicircle or a semiellipse is drawn C is again set equal to 1 and D equal to 0. Each of these cases are treated as though a straight line is being drawn and the function generator is allowed to oscillate through 180°. For a full circle or ellipse, from Equation 5 hereinabove, it will be evident that the quantity C will equal −1. Again D equals 0. For a quarter circle or ellipse the quantity C will be zero and the quantity D will be +1. For three-quarters of a circle or an ellipse the quantity C will be 0 and the quantity D will be −1. The values +1 and −1 for either or both C or D may be taken as any suitabzle part of the maximum value of the quantities C or D which may be set by the attenuators. As pointed out earlier, the quantities C and D are not necessarily related to the quantities A and B in magnitude. In any case, the specific value of C or D may be computed from Equation 5. For conditions other than the special cases identified immediately above, it has been shown that the quantities C and D will vary depending upon the number of degrees in the circular arc or elliptical arc which is being drawn.

If a full circle is to be drawn the quantity C will be equal to −1. The output at summing junction ZJ under these conditions will be a positive going sine wave voltage swinging through zero at 180° from positive to negative and then swinging through zero at 360° going from negative to positive. With the application of the positive going sine wave voltage to its input circuits, amplifier ZA switches negative. The negative pulse is not applied to amplifier ZA2 since contacts K11d are still open when the pulse is generated. Since the amplifier ZA2 is now conducting it is sensitive only to the negative to positive swing of the sine wave voltage, $E_z$, through zero, the excursion through zero at 180° (positive to negative) is ineffective to terminate drawing of the line. Consequently, the line terminating voltage allows free running of the function generator through 360° prior to lifting the pen from the surface of the drawing board.

Attention is directed to the fact that the circuits as arranged herein utilize cosine varying voltages on both the X and the Y servos in the generation of straight lines. This is advantageous in that the rate of change of the servo voltage is low, both at the beginning and at the end of the line. Hence, the servos accelerate the pen slowly and smoothly from zero speed through maximum line drawing speed and then as the end of the line is approached, gradually decelerate the pen. The line is drawn smoothly and the line is drawn straight since the servos are not confronted with rapid voltage changes. The use of the cosine voltages is additionally advantageous in effecting the termination of a line. Here again since the rate of change of voltage is approaching zero at the end of the line, the servo speed is correspondingly low. Hence, the occurrence of zero in the line terminating voltage, proceeding from negative to positive, is highly effective in precisely terminating the line at its end point.

Since the rate of travel of the pen in drawing a straight line varies as described provision is made as noted hereinabove during periods when straight lines are being drawn and a broken line characteristic is specified, to switch a time varying voltage into the input of the line characteristic generator LCG. This character of operation is achieved by intelligence derived from the circular arc and ellipse relays which in their deenergized condition denote a straight line is to be drawn. Contacts K21c and K21b are closed when these relays, K21 and K22, respectively, are deenergized and connect a time varying voltage designated, $-ER$ sin $\omega t$, to the input terminal T6 of the line characteristic generator through contacts K16b which are closed when a line characteristic signal exists. Since the motor M of the line characteristic generator is part of a velocity servo, by this expedient, the commutator speeds are varied as a function of sin $\omega t$. The commutator speed, and, hence, the rate at which the pen down signal is inhibited, is proportional to the speed of operation of the pen.

In drawing a circular arc or an ellipse, as described hereinabove, the speed of one of the servos is controlled by a voltage which varies as a function of the sine of $\omega t$ and the speed of the other servo is controlled by a voltage varying as a function of the cosine of $\omega t$. Thus, the servo rates may differ markedly and in fact one may be zero while the other is operating at maximum speed. The pen speed around the circle is substantially constant and varies only slightly on most ellipses. For this reason, in programming either a circular arc or an ellipse, the time varying voltages are removed from the input of the line characteristic generator and a constant voltage, $-E_R$, applied thereto by either of contacts K21c or K22b upon energization of the respective relays. It will be recalled energization of either of these relays interchange the sine voltage for the cosine voltage in the Y motor servo circuit. Under this condition the dashes or dots or combinations thereof vary slightly in length around an ellipse but the variations in length are insufficient to be easily noted other than by fairly close inspection.

Although but one embodiment of this invention has been described herein it will be appreciated by those skilled in the art that numerous changes may be made in certain organizational aspects hereof and that numerous changes may be made in the details of circuits which are employed herein to achieve the stated results. It is therefore intended that the foregoing disclosure and the showing made in the drawing shall be considered only as illustrative of the principles of this invention and are not to be construed in a limiting sense.

What is claimed is:
1. A line generating system, comprising:
a pair of servos having respective input circuits and having respective output motors;
a device having a pair of input members connected to and driven by said motors, respectively, and having a movable line generating output member connected to and driven by both of said input members in substantially mutually perpendicular directions;
control means, including a variable frequency oscillator, for producing time varying line generating voltages and having respective output circuits connected to said respective input circuits of said servos for controlling said servos;
and means connected to said oscillator for varying the frequency thereof substantially inversely proportionally to the length of a line.

2. A line generating system, comprising:
a pair of servos having respective input circuits and having respective output motors;
a device having a pair of input members connected to and driven by said motors, respectively, and having a movable line generating output member connected to and driven by both of said input members in substantially mutually perpendicular directions;
control means, including a variable frequency oscillator, for producing time varying line generating voltages and having respective output circuits connected to said respective input circuits of said servos for controlling said servos;
and means connected to said oscillator for setting said oscillator in a non-oscillating mode of operation and subsequently setting said oscillator in an oscillating mode of operation.

3. A line generating system, comprising:
a pair of servos having respective input circuits and having respective output motors;
a device having a pair of input members connected to and driven by said motors, respectively, and having a movable line generating output member connected to and driven by both of said input members;
variable control means, including a frequency oscillator, for producing time varying line generating voltages and having respective output circuits connected to said respective input circuits of said servos for controlling said servos;
and means coupled to and controlled by said oscillator for disconnecting said control means from said servos.

4. A line generating system, comprising:
a pair of servos having respective input circuits and having respective output motors;
a device having a pair of input members connected to and driven by said motors, respectively, and having a movable line generating output member connected to and driven by both of said input members in substantially mutually perpendicular directions;
control means, including a variable frequency oscillator, for producing time varying line generating voltages and having respective output circuits connected to said respective input circuits of said servos for controlling said servos;
means coupled to and controlled by said oscillator for disconnecting said control means from said servos;
and means coupled to and controlled by said oscillator for stopping said oscillator.

5. An electrical control system, comprising:
a pair of motors;
a device having a pair of input members connected to said motors, respectively, and driven thereby and having a single output member coupled to and controlled by both of said input members;
an electrical signal producing device connected to and operated by each motor;
respective motor control circuits connected to each motor, each for combining electrical quantities from the associated electrical signal producing device in opposition with input electrical quantities for regulating said motors, respectively;

circuit means coupled to each of said motor control circuits for applying respective fixed input electrical quantities thereto;

a variable voltage generator for generating time varying voltages displaced in phase by 90 electrical degrees;

and circuit means having control elements connected to and controlled by both of said motor control circuits for applying at least one of said time varying voltage to both of said motor control circuits when a predetermined minimum voltage occurs in both of said motor control circuits.

6. An electrical control system, comprising:

a pair of motors;

a device having a pair of input members connected to said motors, respectively, and driven thereby and having a single output member controlled by both of said input members;

an electrical signal producing device connected to and operated by each motor;

respective motor control circuits connected to each motor, each for combining electrical quantities from the associated electrical signal producing device in opposition with input electrical quantities for controlling said motors, respectively;

circuit means coupled to said each of said motor control circuits for applying respective fixed electrical quantities thereto;

control circuit means electrically connected with each of said motor control circuits means for providing an electrical control signal whenever the electrical outputs of both motor control circuits are below a minimum value;

a variable voltage generator for generating at least two time varying voltages displaced in phase from one another;

and circuit means including control elements connected to said control circuit means and controlled by said control signal for connecting one time varying voltage to one of said motor control circuits, and the other time varying voltage to the other of said motor control circuits.

7. An electrical control system, comprising:

a pair of motors;

a device having a pair of input members connected to said motors, respectively, and driven thereby and having a single output member controlled by both of said input members;

control means including an oscillator for generating time varying line generating voltages;

circuit means connecting said control means to said motors to apply one time varying line generating voltage to one motor and the other time varying line generating voltage to the other motor;

signal generating means synchronized with said oscillator for generating a stop signal;

means connected to said signal generating means and said circuit means for responding to said stop signal to control said circuit means to stop said motors;

and means connected to said signal generating means and said oscillator for responding to said stop signal to stop oscillation of said oscillator.

8. A line generating system, comprising:

a pair of servos having respective input circuits and having respective output motors;

a device having a pair of input members connected to and driven by said motors, respectively, and having a movable line generating output member connected to and driven by both of said input members in substantially mutually perpendicular directions;

circuit means coupled to said input circuits of said servos for producing control voltages representative of the geometric center of a line to be described;

a double integrator oscillator having a pair of output circuits and having a variable attenuator input circuit for each integrator;

means connected to each attenuator circuit for varying the attenuation of each in substantially the same amount to control the frequency of oscillation of said oscillator;

and circuit means connecting said respective output circuits of said oscillator to said respective input circuits of said servos.

9. A line generating system, comprising:

a pair of servos having respective input circuits and having respective output motors;

a device having a pair of input members connected to and driven by said motors, respectively, and having a movable line generating output member connected to and driven by both of said input members in substantially mutually perpendicular directions;

a double integrator oscillator having a pair of output circuits, having an integrator input circuit for each integrator and having a variable attenuator input circuit for each integrator;

means connected to each attenuator input circuit for varying the attenuation of each in substantially the same amount to control the frequency of oscillation of said oscillator;

switch means coupled to each integrator input circuit for selectively switching each integrator input circuit between the associated variable attenuator circuit and a fixed potential;

means coupled to said respective input circuits of said servos for coupling fixed control signals thereto;

and circuit means connecting said respective output circuits of said oscillator to said respective input circuits of said servos.

10. A line generating system, comprising:

a pair of servos having respective input circuits and having respective output motors;

a device having a pair of input members connected to and driven by said motors, respectively, and having a movable line generating output member connected to and driven by both of said input members in substantially mutually perpendicular directions;

means including a variable frequency oscillator, having respective output circuits connected to said respective input circuits of said servos and producing time varying, line generating voltages;

controllable circuit means coupled to said oscillator for varying the frequency;

means for producing a quantity indicative of the length of a line to be generated;

and means connected to and controlled by said last named means and coupled to said controllable circuit means for controlling the frequency of said oscillator.

11. a line generating system, comprising:

a pair of servos having respective input circuits and having respective output motors;

a device having a pair of input members connected to and driven by said motors, respectively, and having a movable line generating output member connected to and driven by both of said input members in substantially mutually perpendicular directions;

variable frequency oscillator means having respective output circuits connected to said respective input circuits of said servos and producing time varying, line generating voltages;

controllable circuit means coupled to said oscillator for varying the frequency;

means for producing respective X and Y position voltages defining the geometric center of a figure to be drawn;

means for producing a quantity indicative of one coordinate of the starting point of a line describing a geometric figure, with respect to the geometric center of the figure;

means connected to and controlled by said last named means and coupled to said controllable circuit means for controlling the frequency of said oscillator;

and circuit means connected to each servo input circuit for applying thereto the corresponding one of said X and Y voltages and the corresponding one of said line generating voltages.

12. A line generating system, comprising:

a pair of servos having respective input circuits and respective output motors;

a device having a pair of input members connected to and driven by said motors, respectively, and having a movable line generating output member connected to and driven by both of said input members in substantially mutually perpendicular directions;

an oscillator having at least one output circuit;

switching circuit means coupled to said oscillator for switching said oscillator between a non-oscillating mode of operation and an oscillating mode of operation and normally maintaining said oscillator in said non-oscillating mode;

respective amplitude modulators connecting said at least one output circuit of said oscillator to said respective input circuit of said servos;

respective means coupled to said respective input circuits of said servos for producing respective electrical quantities indicative of the X and Y coordinates of the geometric center of a figure to be drawn;

respective controls coupled to said amplitude modulators for controlling said modulators in proportion to the X and Y coordinates, respectively, of the starting point of a line describing a figure with respect to its geometric center;

and means coupled between said servos and said switching circuit means for operating said switching circuit means when movement of said motors is substantially zero to switch said oscillator to said oscillating mode of operation.

13. A line generating system, comprising:

a pair of servos having respective input circuits and respective output motors;

a device having a pair of input members connected to and driven by said motors, respectively, and having a movable output member connected to and driven by both of said input members in substantially mutually perpendicular directions;

an oscillator having respective output circuits;

switching circuit means coupled to said oscillator for switching said oscillator between a non-oscillating mode of operation and an oscillating mode of operation and normally maintaining said oscillator in said non-oscillating mode;

respective amplitude modulators connecting said output circuits of said oscillator to the respective input circuits of said servos;

respective means coupled to said input circuits of said servos for producing respective electrical quantities indicative of the respective X and Y coordinates of the geometric center of a line describing a geometric figure to be drawn;

respective controls coupled to said amplitude modulators for controlling said modulators in proportion to the X and Y coordinates, respectively, of the starting point of said line describing said geometric figure with respect to its geometric center;

means coupled between said servos and said switching circuit means for operating said switching circuit means when movement of said motors is substantially zero to switch said oscillator to said oscillating mode of operation;

a movable normally retracted line drawing implement supported by said output member;

and control means coupled to and controlled by said last named means and coupled to said line drawing implement for moving said line drawing implement to line drawing position when movement of said motors is substantially zero.

14. A line generating system, comprising:

a pair of servos having respective input circuits and respective output motors;

a device having a pair of input members connected to and driven by said motors, respectively, and having a movable output member connected to and driven by both of said input members in substantially mutually perpendicular directions;

an oscillator having respective output circuits;

switching circuit means coupled to said oscillator for switching said oscillator between a non-oscillating mode of operation and an oscillating mode of operation and normally maintaining said oscillator in said non-oscillating mode;

respective amplitude modulators connecting said output circuits of said oscillator to the respective input circuits of said servos;

respective means coupled to said input circuits of said servos for producing respective electrical quantities indicative of the respective X and Y coordinates of the geometric center of a line describing a geometric figure to be drawn;

respective controls coupled to said amplitude modulators for controlling said modulators in proportion to the X and Y coordinates, respectively, of the starting point of said line describing said geometric figure with respect to its geometric center;

means coupled between said servos and said switching circuit means for operating said switching circuit means when movement of said motors is substantially zero to switch said oscillator to said oscillating mode of operation;

and circuit means connected to and controlled by said oscillator means for deenergizing said input circuits of said servos and for controlling said switching circuit means to return said oscillator means to said non-oscillating mode.

15. A line generating system, comprising:

a pair of servos having respective input circuits and respective output motors;

a device having a pair of input members connected to and driven by said motors, respectively, and having a movable output member connected to and driven by both of said input members in substantially mutually perpendicular directions;

an oscillator having respective output circuits;

switching circuit means coupled to said oscillator for switching said oscillator between a non-oscillating mode of operation and an oscillating mode of operation and normally maintaining said oscillator in said non-oscillating mode;

respective amplitude modulators connecting the output circuits of said oscillator to said respective input circuits of said servos;

respective means coupled to said input circuits of said servos for producing respective electrical quantities indicative of the respective X and Y coordinates of the geometric center of a line describing a geometric figure to be drawn;

respective controls coupled to said amplitude modulators for controlling said modulators in proportion to the X and Y coordinates, respectively, of the starting point of said line describing said geometric figure with respect to its geometric center;

means coupled between said servos and said switching circuit means for operating said switching circuit means when movement of said motors is substantially zero to switch said oscillator to said oscillating mode of operation;

a movable normally retracted line drawing implement supported by said output member;

control means coupled to and controlled by said last named means and coupled to said line drawing implement for moving said line drawing implement to line drawing position when movement of said motors is substantially zero;

and circuit means connected to and controlled by said oscillator, having a connection with said input circuits of said servos for deenergizing said servos, having a connection with said control means for retracting said line drawing implement, and having a connection with said switching circuit means for returning said oscillator to said non-oscillating mode of operation.

16. A line generating system, comprising:

first means for producing a voltage indicative of one coordinate of the geometric center of a line to be described;

second means for producing a voltage indicative of a second coordinate of said geometric center of said line;

variable frequency oscillator means for producing a time varying periodic voltage;

means coupled to said oscillator means to vary the frequency thereof substantially inversely proportionally to the length of said line;

and line generating means having a first input circuit coupled to and controlled by said first means and said oscillator means, and having a second input circuit coupled to and controlled by said second means and said oscillator means.

17. A line generating system, comprising:

first means for producing a voltage indicative of one coordinate of the geometric center of a line to be described;

second means for producing a voltage indicative of a second coordinate of said geometric center of said line;

variable frequency oscillator means, having an output circuit, for producing a time varying periodic voltage;

means coupled to said oscillator means to vary the frequency thereof substantially inversely proportionally to the length of said line;

line generating means having a first input circuit coupled to and controlled by said first means and having a second input circuit coupled to and controlled by said second means;

a first coupling circuit coupling said output circuit of said oscillator means to said first input circuit of said line generating means;

a second coupling circuit coupling said output circuit of said oscillator means to said second input circuit of said line generating means;

circuit means coupled to and controlling said first coupling means in accordance with a first coordinate of the starting point of said line with respect to said geometric center;

and circuit means coupled to and controlling said second coupling means in accordance with a second coordinate of said starting point of said line with respect to said geometric center.

References Cited by the Examiner

UNITED STATES PATENTS

| | | |
|---|---|---|
| 2,784,359 | 3/1957 | Kamm. |
| 2,995,302 | 8/1961 | Ingwerson et al. |
| 3,019,072 | 1/1962 | Bose et al. _____ 346—8 X |
| 3,035,216 | 5/1962 | Rhoades et al. _____ 318—162 |
| 3,036,303 | 5/1962 | Samson _____ 33—1 X |
| 3,050,673 | 8/1962 | Widmer. |

OTHER REFERENCES

Project Cyclone: Symposium II on Simulation and Computing Techniques, Part 2, April 28–May 2, 1952, New York City, Reeves Instrument Corporation (pages 94, 187–191 and 193).

Project Cyclone: Symposium I on REAC Techniques, March 15–16, 1951, New York City, Reeves Instrument Corporation (page 69).

ORIS L. RADER, *Primary Examiner.*